United States Patent
Dixon et al.

(10) Patent No.: US 10,677,709 B2
(45) Date of Patent: Jun. 9, 2020

(54) PARTICLE DETECTION CARTRIDGES, SYSTEMS THEREOF AND METHODS FOR USING THE SAME

(71) Applicant: Becton, Dickinson and Company, Franklin Lakes, NJ (US)

(72) Inventors: Jonathan V. Dixon, San Diego, CA (US); Jianying Cao, San Jose, CA (US); Edward Michael Goldberg, Los Gatos, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 125 days.

(21) Appl. No.: 15/940,698

(22) Filed: Mar. 29, 2018

(65) Prior Publication Data

US 2018/0313743 A1   Nov. 1, 2018

Related U.S. Application Data

(60) Provisional application No. 62/491,957, filed on Apr. 28, 2017.

(51) Int. Cl.
*G01N 15/14*   (2006.01)
*G01N 15/08*   (2006.01)
(Continued)

(52) U.S. Cl.
CPC .... *G01N 15/1434* (2013.01); *B01L 3/502715* (2013.01); *G01N 15/0806* (2013.01);
(Continued)

(58) Field of Classification Search
CPC ........... G01N 15/1434; G01N 15/0806; G01N 2015/0846; G01N 2015/0038;
(Continued)

(56) References Cited

U.S. PATENT DOCUMENTS 4,338,279 A * 7/1982 Orimo .................. G01N 21/253
                                                      422/64
5,439,578 A * 8/1995 Dovichi ........... G01N 27/44721
                                                      204/603
(Continued)

FOREIGN PATENT DOCUMENTS

EP   1143014 A2   11/2003
EP   1143016 A2   11/2003
(Continued)

OTHER PUBLICATIONS

Grafton, et al. "Microfluidic MEMS Hand-Held Flow Cytometer"; Microfluidic, BioMEMS and Medical Microsystems IX vol. 7929, 2011.

*Primary Examiner* — Mohamed K Amara
(74) *Attorney, Agent, or Firm* — Michael J. Blessent; Bret E. Field; Bozicevic, Field & Francis LLP

(57) ABSTRACT

Particle detection cartridges are provided. Aspects of the particle detection cartridges according to certain embodiments include a sample input, a flow channel and a light channel, where the flow channel and light channel are coupled at a detection region such that only light from the detection region can propagate directly through the light channel to a detector. Systems including the cartridges, as well as methods for detecting particles in a sample with the subject particle detection cartridges/systems, are also described. Kits having one or more cartridges are also provided.

19 Claims, 3 Drawing Sheets

(51) Int. Cl.
  *G01N 15/10* (2006.01)
  *B01L 3/00* (2006.01)
  *G01N 21/03* (2006.01)
  *G01N 15/00* (2006.01)
  *G01N 21/66* (2006.01)
  *G01N 21/64* (2006.01)
  *G01N 21/65* (2006.01)

(52) U.S. Cl.
  CPC ....... *G01N 15/1056* (2013.01); *G01N 15/147* (2013.01); *G01N 15/1436* (2013.01); *G01N 21/0303* (2013.01); *B01L 3/502761* (2013.01); *B01L 2300/0645* (2013.01); *B01L 2300/168* (2013.01); *G01N 21/66* (2013.01); *G01N 2015/0038* (2013.01); *G01N 2015/0065* (2013.01); *G01N 2015/03* (2013.01); *G01N 2015/0846* (2013.01); *G01N 2015/1006* (2013.01); *G01N 2015/1452* (2013.01); *G01N 2021/0325* (2013.01); *G01N 2021/0346* (2013.01); *G01N 2021/6482* (2013.01); *G01N 2021/651* (2013.01)

(58) Field of Classification Search
  CPC ... G01N 2015/0065; G01N 2015/1452; G01N 2015/03; G01N 21/66; G01N 2021/0325; G01N 2021/0346; G01N 2021/6482; G01N 2021/651; G01N 21/0303; G01N 15/1056; G01N 15/147; G01N 2015/1006; G01N 15/1436; B01L 3/502761; B01L 2300/0645; B01L 2300/168; B01L 3/502715
  See application file for complete search history.

(56) References Cited

U.S. PATENT DOCUMENTS

| | | | | |
|---|---|---|---|---|
| 5,674,743 | A * | 10/1997 | Ulmer | B01J 19/0046 435/287.2 |
| 6,097,485 | A | 8/2000 | Lievan | |
| 6,712,925 | B1 | 3/2004 | Holl et al. | |
| 7,226,562 | B2 * | 6/2007 | Holl | B01F 5/0646 422/50 |
| 7,349,158 | B2 * | 3/2008 | Moon | B01L 3/502761 359/569 |
| 7,863,035 | B2 * | 1/2011 | Clemens | G01N 27/27 417/322 |
| 8,277,764 | B2 | 10/2012 | Gilbert et al. | |
| 8,956,536 | B2 | 2/2015 | Yu et al. | |
| 9,115,340 | B2 * | 8/2015 | Zhang | B01L 3/502761 |
| 9,499,422 | B1 * | 11/2016 | Carson | C02F 1/72 |
| 9,645,143 | B2 * | 5/2017 | Holmes | G01N 35/026 |
| 9,658,222 | B2 * | 5/2017 | Moll | G01N 33/54373 |
| 9,835,540 | B2 | 12/2017 | Yu et al. | |
| 10,114,020 | B2 * | 10/2018 | Dunn | G01N 33/56972 |
| 2004/0161772 | A1 | 8/2004 | Bohm et al. | |
| 2005/0180891 | A1 * | 8/2005 | Webster | B01L 3/50273 422/505 |
| 2007/0254004 | A1 * | 11/2007 | Rosero | A61B 5/076 424/423 |
| 2008/0026373 | A1 * | 1/2008 | Rodionova | B01L 3/5027 435/6.18 |
| 2008/0032380 | A1 * | 2/2008 | Kleis | C12M 23/04 435/243 |
| 2008/0155985 | A1 * | 7/2008 | Labrador | F01K 27/00 60/698 |
| 2009/0161108 | A1 * | 6/2009 | Frese | B01L 3/5027 356/440 |
| 2010/0291588 | A1 * | 11/2010 | McDevitt | B01L 3/502715 435/7.2 |
| 2010/0317093 | A1 * | 12/2010 | Turewicz | B01L 3/50273 435/287.2 |
| 2012/0140205 | A1 * | 6/2012 | Kaduchak | G01N 21/645 356/39 |
| 2013/0266480 | A1 * | 10/2013 | Kimura | B01L 3/5027 422/69 |
| 2013/0315780 | A1 * | 11/2013 | Cook | G01N 21/66 422/52 |
| 2013/0337475 | A1 * | 12/2013 | Horii | G01N 33/54393 435/7.25 |
| 2014/0320861 | A1 * | 10/2014 | van den Engh | G01N 21/85 356/440 |
| 2015/0132860 | A1 * | 5/2015 | Cook | G01N 35/1079 436/501 |
| 2015/0211981 | A1 * | 7/2015 | Pampaloni | G02B 21/16 250/453.11 |
| 2015/0276708 | A1 * | 10/2015 | Kataoka | G01N 21/6452 506/12 |
| 2016/0008811 | A1 * | 1/2016 | Laser | G01N 33/54366 424/184.1 |
| 2016/0184824 | A1 * | 6/2016 | Hansen | C30B 7/08 422/502 |
| 2016/0231223 | A1 * | 8/2016 | Wang | G01N 15/1404 |
| 2016/0356722 | A1 * | 12/2016 | Glezer | B01J 19/0046 |
| 2017/0189879 | A1 * | 7/2017 | Simsek | B01J 13/04 |
| 2018/0187139 | A1 * | 7/2018 | Patel | C12M 41/14 |
| 2018/0196278 | A1 * | 7/2018 | Duncan | G02B 1/11 |
| 2018/0200717 | A1 * | 7/2018 | Yang | B01L 3/502761 |

FOREIGN PATENT DOCUMENTS

| | | |
|---|---|---|
| EP | 1745275 B1 | 1/2007 |
| WO | WO2004/048948 A1 | 6/2004 |

* cited by examiner

PARTICLE DETECTION CARTRIDGES, SYSTEMS THEREOF AND METHODS FOR USING THE SAME

CROSS-REFERENCE TO RELATED APPLICATION

Pursuant to 35 U.S.C. § 119(e), this application claims priority to the filing date of U.S. Provisional Patent Application Ser. No. 62/491,957 filed Apr. 28, 2017; the disclosure of which application is incorporated herein by reference.

INTRODUCTION

The characterization of analytes in biological fluids has become an integral part of medical diagnoses and assessments of overall health and wellness of a patient. In particular, analyte detection in physiological fluids, e.g., blood or blood derived products, can be important where the results may play a prominent role in the treatment protocol of a patient in a variety of disease conditions. Diagnosis of disorders of the blood, such as anemia, sickle cell anemia, loss of blood, nutritional deficiency, bone marrow problems and disorders, polycythemia rubra vera, dehydration, kidney diseases, liver dysfunction and many types of cancers can often be aided by analyte characterization of biological fluids.

SUMMARY

Particle detection cartridges are provided. Aspects of the particle detection cartridges according to certain embodiments include a sample input, a flow channel and a light channel, where the flow channel and light channel are coupled at a detection region such that only light from the detection region can propagate directly through the light channel to a detector. Systems including the cartridges, as well as methods for detecting particles in a sample with the subject particle detection cartridges/systems, are also described. Kits having one or more cartridges are also provided.

Aspects of the present disclosure include a particle detection cartridge configured to propagate light from a sample to a detector. Cartridges according to certain embodiments include a sample input, a flow channel and a light channel where the flow channel and light channel are coupled at a detection region such that only light from the detection region can propagate directly through the light channel to the detector. In some embodiments, the light channel includes an anti-reflective region. The anti-reflective region of the light channel may include an anti-reflective coating, such as a single layer interference anti-reflective coating, a multi-layer interference anti-reflective coating, an absorbing anti-reflective or a textured anti-reflective coating. In certain instances, the anti-reflective coating is polymeric. In other instances, the anti-reflective coating includes a compound such as silica, titanium dioxide, zinc oxide, silicon nitride, carbon black or aluminum oxide. In the subject cartridges, the light channel is positioned at an angle with respect to the flow channel, such as where the light channel is orthogonal to the flow channel. In some embodiments, the cartridge further includes a waste collection zone. In certain instances, cartridges also include sample composition preloaded in the cartridge.

Aspects of the present disclosure also include systems for detecting particle components of a sample. Systems according to certain embodiments include a power source configured to be operably coupled to an excitation source (e.g., a light source), a photodetector configured to measure one or more wavelengths of light and a cartridge having a sample input, a flow channel and a light channel where the flow channel and light channel are coupled at a detection region such that only light from the detection region can propagate directly through the light channel to the photodetector. In some embodiments, the excitation source is a light source, such as a non-amplified light source (e.g., a light emitting diode). In other embodiments, the excitation source is configured to apply an electrical stimulus (e.g., an electrode) to a sample flowing through the flow path of the cartridge, such as an electrical stimulus sufficient to stimulate fluorescence by particles in the sample.

Methods for detecting particles of a sample are also provided. Methods according to certain embodiments include applying a stimulus from an excitation source to a sample having particles and detecting one or more wavelengths of light propagated from the detection region through the light channel of the cartridge. In some embodiments, the sample is irradiated with light. In other embodiments, an electrical stimulus is applied to the sample. In certain instances, the photodetector is positioned orthogonally with respect to the detection region. The sample may be a biological sample having cells. The biological sample, in certain embodiments include a labelling reagent, such as a fluorophore, chromophore, enzyme, redox label, radiolabels, acoustic label, Raman (SERS) tag, mass tag, isotope tag, magnetic particle, microparticle or nanoparticle. In some instances, the labelling reagent includes a labelled biomolecule, such as a polypeptide, a nucleic acid and a polysaccharide that is labelled with a compound selected from the group consisting of a fluorophore, chromophore, enzyme, redox label, radiolabels, acoustic label, Raman (SERS) tag, mass tag, isotope tag, magnetic particle, microparticle or nanoparticle.

BRIEF DESCRIPTION OF THE FIGURES

The invention may be best understood from the following detailed description when read in conjunction with the accompanying drawings. Included in the drawings are the following figures.

DETAILED DESCRIPTION

Figure 1:
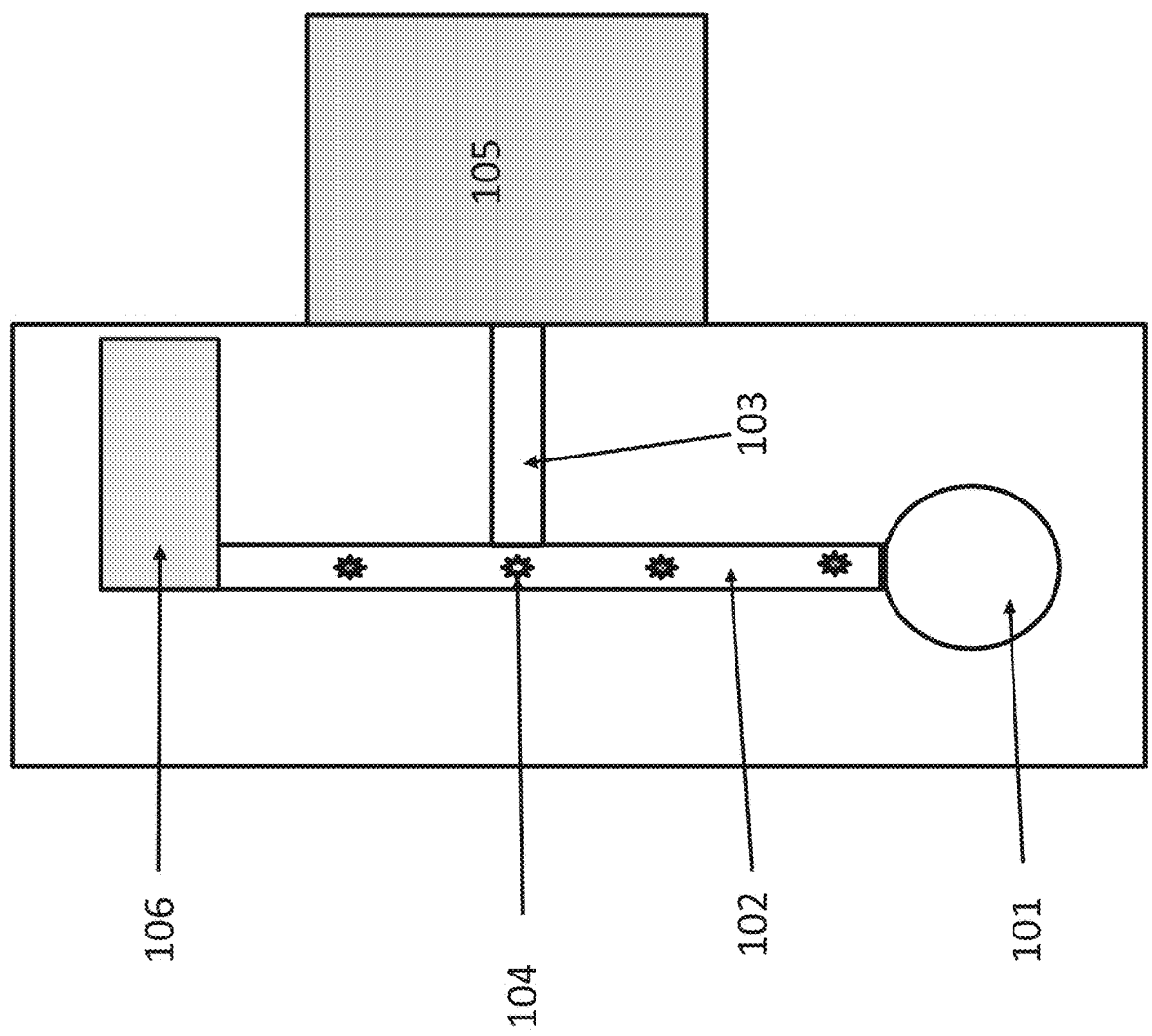
FIG. 1 depicts a top view of a cartridge according to certain embodiments.

Particle detection cartridges are provided. Aspects of the particle detection cartridges according to certain embodiments include a sample input, a flow channel and a light channel, where the flow channel and light channel are coupled at a detection region such that only light from the detection region can propagate directly through the light channel to a detector. Systems including the cartridges, as well as methods for detecting particles in a sample with the subject particle detection cartridges/systems, are also described. Kits having one or more cartridges are also provided.

Before the present invention is described in greater detail, it is to be understood that this invention is not limited to particular embodiments described, as such may vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

As summarized above, the present disclosure provides a particle detection cartridge configured to propagate light from a sample to a detector. In further describing embodiments of the disclosure, particle detection cartridges are first described in greater detail. Next, systems and methods for detecting particles in a sample are described. Kits having one or more of the subject cartridges are also provided.

Particle Detection Cartridges

As summarized above, aspects of the present disclosure include particle detection cartridges configured to propagate light from a sample to a detector. In embodiments, cartridges include a sample input, a flow channel and a light channel where the flow channel and light channel are coupled at a detection region such that only light from the detection region can propagate directly through the light channel to a detector. By "propagate directly" is meant that light from the detection region impinges onto the detector through the lumen of the light channel and is not transmitted through or reflected by the walls of the light channel. In other words, light propagates through the free space of the light channel or where present, fluid in the light channel and reaches the detector surface without being propagated through the walls of the flow channel or the light channel. In certain embodiments, light from the detection region is propagated through the free space of the light channel and impinges onto an optical adjustment component before being propagated to the detector.

In embodiments, sample cartridges include a sample input. The sample input may be a structure configured to receive a sample having a volume ranging from 5 µL to 1000 µL, such as from 10 µL to 900 µL, such as from 15 µL to 800 µL, such as from 20 µL to 700 µL, such as from 25 µL to 600 µL, such as from 30 µL to 500 µL, such as from 40 µL to 400 µL, such as from 50 µL to 300 µL and including from 75 µL to 250 µL. The sample input may be any convenient shape, so long as it provides for fluid access, either directly or through an intervening component that provides for fluidic communication, to the flow channel. In some embodiments, the sample input is planar. In other embodiments, the sample input is concave, such as in the shape of an inverted cone terminating at the sample input orifice. Depending on the amount of sample applied and the shape of the sample input, the sample input may have a surface area ranging from 0.01 mm$^2$ to 1000 mm$^2$, such as from 0.05 mm$^2$ to 900 mm$^2$, such as from 0.1 mm$^2$ to 800 mm$^2$, such as from 0.5 mm$^2$ to 700 mm$^2$, such as from 1 mm$^2$ to 600 mm$^2$, such as from 2 mm$^2$ to 500 mm$^2$ and including from 5 mm$^2$ to 250 mm$^2$.

The inlet connecting the sample input to the flow channel may be any suitable shape, where cross-sectional shapes of inlets of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. The dimensions of the inlet may vary, in some embodiments ranging from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. In some embodiments, the inlet is a circular orifice and the diameter of the inlet ranges from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. Accordingly, depending on the shape of the inlet, the inlet orifice may have an opening which varies, ranging from 0.01 mm$^2$ to 250 mm$^2$, such as from 0.05 mm$^2$ to 200 mm$^2$, such as from 0.1 mm$^2$ to 150 mm$^2$, such as from 0.5 mm$^2$ to 100 mm$^2$, such as from 1 mm$^2$ to 75 mm$^2$, such as from 2 mm$^2$ to 50 mm$^2$ and including from 5 mm$^2$ to 25 mm$^2$.

In certain embodiments, a porous matrix is positioned between the sample input and the flow channel. By "porous matrix" is meant a substrate which contains one or more pore structures configured for the permeation of liquid components therethrough. In some instances, the porous matrix contains a network of interconnected pores that provides a medium for mixing an applied sample (e.g., a biological sample as discussed in greater detail below) with an assay reagent.

The porous matrix positioned between the sample input and the flow channel may be any suitable shape, such as planar polygonal shapes including but not limited to a circle, oval, half-circle, crescent-shaped, star-shaped, square, triangle, rhomboid, pentagon, hexagon, heptagon, octagon, rectangle or other suitable polygon. In other embodiments, porous matrices of interest are three-dimensional, such as in the shape of a cube, cone, half sphere, star, triangular prism, rectangular prism, hexagonal prism or other suitable polyhedron. In certain embodiments, the porous matrix is disk-shaped. In other embodiments, the porous matrix is cylindrical. The dimensions of the porous matrix may vary, in some embodiments ranging from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. In some embodiments, the porous matrix is a circular and the diameter of the porous matrix ranges from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm and has a height from 0.01 mm to 50 mm, such as from 0.05 mm to 45 mm, such as from 0.1 mm to 40 mm, such as from 0.5 mm to 35 mm, such as from 1 mm to 30 mm, such as from 2 mm to 25 mm, such as from 3 mm to 20 mm, such as from 4 mm to 15 mm and including from 5 mm to 10 mm.

Pore sizes of the porous matrix may also vary, depending on the biological sample and may range from 0.01 µm to 200 µm, such as from 0.05 µm to 175 µm, such as 0.1 µm to 150 µm, such as 0.5 µm to 125 µm, such as 1 µm to 100 µm, such as 2 µm to 75 µm and including 5 µm to 50 µm. In embodiments, the porous matrix may have a pore volume sufficient to contain all or part of the applied sample as desired. For example, 50% or more of the sample volume may fit within the porous matrix, such as 55% or more, such as 60% or more, such as 65% or more, such as 75% or more, such as 90% or more, such as 95% or more, such as 97% or more and including 99% or more of the sample volume may fit within the porous matrix. In certain embodiments, the porous matrix has a pore volume that is sufficient to contain all (i.e., 100%) of the sample. For instance, the pore volume of the porous matrix may range from 0.01 µL to 1000 µL, such as from 0.05 µL to 900 µL, such as 0.1 µL to 800 µL, such as 0.5 µL to 500 µL, such as 1 µL to 250 µL, such as 2 µL to 100 µL and including 5 µL to 50 µL. In embodiments, the void fraction (i.e., the ratio of void volume within the pores and the total volume) of porous matrices of interest ranges from 0.1 to 0.9, such as from 0.15 to 0.85, such as from 0.2 to 0.8, such as from 0.25 to 0.75, such as from 0.3 to 0.7, such as from 0.35 to 0.65 and including from 0.4 to 0.6. Put another way, the pore volume is from 10% and 90% of the total volume of the porous matrix, such as from 15% and 85%, such as from 20% and 80%, such as from 25% and 75%, such as from 30% and 70%, such as from 35% and 65% and including a pore volume from 40% and 60% of the total volume of the porous matrix.

In certain embodiments, the sample is mixed with an assay reagent (e.g., in the porous matrix). Assay reagents that may be present include, but are not limited to, analyte-specific binding members, such as enzymes, antibodies, substrates, oxidizers, among other analyte-specific binding members. Analyte-specific binding members may vary depending on the type of biological sample and components of interest. As used herein, the term "specific binding member" refers to one member of a pair of molecules which have binding specificity for one another. One member of the pair of molecules may have an area on its surface, or a cavity, which specifically binds to an area on the surface of, or a cavity in, the other member of the pair of molecules. Thus the members of the pair have the property of binding specifically to each other to produce a binding complex. In some embodiments, the affinity between specific binding members in a binding complex is characterized by a $K_d$ (dissociation constant) of $10^{-6}$ M or less, such as $10^{-7}$ M or less, including $10^{-8}$ M or less, e.g., $10^{-9}$ M or less, $10^{-10}$ M or less, $10^{-11}$ M or less, $10^{-12}$ M or less, $10^{-13}$ M or less, $10^{-14}$ M or less, including $10^{-15}$ M or less. In some embodiments, the specific binding members specifically bind with high avidity. By high avidity is meant that the binding member specifically binds with an apparent affinity characterized by an apparent $K_d$ of $10 \times 10^{-9}$ M or less, such as $1 \times 10^{-9}$ M or less, $3 \times 10^{-10}$ M or less, $1 \times 10^{-10}$ M or less, $3 \times 10^{-11}$ M or less, $1 \times 10^{-11}$ M or less, $3 \times 10^{-12}$ M or less or $1 \times 10^{-12}$ M or less.

The specific binding member can be proteinaceous. As used herein, the term "proteinaceous" refers to a moiety that is composed of amino acid residues. A proteinaceous moiety can be a polypeptide. In certain cases, the proteinaceous specific binding member is an antibody. In certain embodiments, the proteinaceous specific binding member is an antibody fragment, e.g., a binding fragment of an antibody that specific binds to a polymeric dye. As used herein, the terms "antibody" and "antibody molecule" are used interchangeably and refer to a protein consisting of one or more polypeptides substantially encoded by all or part of the recognized immunoglobulin genes. The recognized immunoglobulin genes, for example in humans, include the kappa (k), lambda (l), and heavy chain genetic loci, which together comprise the myriad variable region genes, and the constant region genes mu (u), delta (d), gamma (g), sigma (e), and alpha (a) which encode the IgM, IgD, IgG, IgE, and IgA isotypes respectively. An immunoglobulin light or heavy chain variable region consists of a "framework" region (FR) interrupted by three hypervariable regions, also called "complementarity determining regions" or "CDRs". The extent of the framework region and CDRs have been precisely defined (see, "Sequences of Proteins of Immunological Interest," E. Kabat et al., U.S. Department of Health and Human Services, (1991)). The numbering of all antibody amino acid sequences discussed herein conforms to the Kabat system. The sequences of the framework regions of different light or heavy chains are relatively conserved within a species. The framework region of an antibody, that is the combined framework regions of the constituent light and heavy chains, serves to position and align the CDRs. The CDRs are primarily responsible for binding to an epitope of an antigen. The term antibody is meant to include full length antibodies and may refer to a natural antibody from any organism, an engineered antibody, or an antibody generated recombinantly for experimental, therapeutic, or other purposes as further defined below.

Antibody fragments of interest include, but are not limited to, Fab, Fab', F(ab')2, Fv, scFv, or other antigen-binding subsequences of antibodies, either produced by the modification of whole antibodies or those synthesized de novo using recombinant DNA technologies. Antibodies may be monoclonal or polyclonal and may have other specific activities on cells (e.g., antagonists, agonists, neutralizing, inhibitory, or stimulatory antibodies). It is understood that the antibodies may have additional conservative amino acid substitutions which have substantially no effect on antigen binding or other antibody functions.

In certain embodiments, the specific binding member is a Fab fragment, a F(ab')$_2$ fragment, a scFv, a diabody or a triabody. In certain embodiments, the specific binding member is an antibody. In some cases, the specific binding member is a murine antibody or binding fragment thereof. In certain instances, the specific binding member is a recombinant antibody or binding fragment thereof.

In addition to antibody binding agents, analyte specific binding members may further include proteins, e.g., enzymes, peptides, haptens, nucleic acids, oligonucleotides. In some embodiments, the analyte-specific binding member is an enzyme. Examples of enzymes may include but are not limited to horseradish peroxidase, pyruvate oxidase, oxaloacetate decarboxylase, creatinine amidohydrolase, creatine amidinohydrolase, sarcosine oxidase, malate dehydrogenase, lactate dehydrogenase, FAD, TPP, P-5-P, NADH, amplex red and combinations thereof.

In some embodiments, the analyte-specific binding member is coupled to a detectable label, such as a fluorescent label. Fluorophores of interest may include but are not limited to dyes suitable for use in analytical applications (e.g., flow cytometry, imaging, etc.), such as an acridine dye, anthraquinone dyes, arylmethane dyes, diarylmethane dyes (e.g., diphenyl methane dyes), chlorophyll containing dyes, triarylmethane dyes (e.g., triphenylmethane dyes), azo dyes, diazonium dyes, nitro dyes, nitroso dyes, phthalocyanine dyes, cyanine dyes, asymmetric cyanine dyes, quinon-imine dyes, azine dyes, eurhodin dyes, safranin dyes, indamins, indophenol dyes, fluorine dyes, oxazine dye, oxazone dyes, thiazine dyes, thiazole dyes, xanthene dyes, fluorene dyes, pyronin dyes, fluorine dyes, rhodamine dyes, phenanthridine dyes, as well as dyes combining two or more of the aforementioned dyes (e.g., in tandem), polymeric dyes having one or more monomeric dye units and mixtures of two or more of the aforementioned dyes thereof. A large number of dyes are commercially available from a variety of sources, such as, for example, Molecular Probes (Eugene, Oreg.), Dyomics GmbH (Jena, Germany), Sigma-Aldrich (St. Louis, Mo.), Sirigen, Inc. (Santa Barbara, Calif.) and Exciton (Dayton, Ohio). For example, the fluorophore may include 4-acetamido-4'-isothiocyanatostilbene-2,2'disulfonic acid; acridine and derivatives such as acridine, acridine orange, acridine yellow, acridine red, and acridine isothiocyanate; allophycocyanin, phycoerythrin, peridinin-chlorophyll protein, 5-(2'-aminoethyl)aminonaphthalene-1-sulfonic acid (EDANS); 4-amino-N-[3-vinylsulfonyl)phenyl]naphthalimide-3,5 disulfonate (Lucifer Yellow VS); N-(4-anilino-1-naphthyl)maleimide; anthranilamide; Brilliant Yellow; coumarin and derivatives such as coumarin, 7-amino-4-methylcoumarin (AMC, Coumarin 120), 7-amino-4-trifluoromethylcouluarin (Coumaran 151); cyanine and derivatives such as cyanosine, Cy3, Cy3.5, Cy5, Cy5.5, and Cy7; 4',6-diaminidino-2-phenylindole (DAPI); 5', 5"-dibromopyrogallol-sulfonephthalein (Bromopyrogallol Red); 7-diethylamino-3-(4'-isothiocyanatophenyl)-4-methylcoumarin; diethylaminocoumarin; diethylenetriamine pentaacetate; 4,4'-diisothiocyanatodihydro-stilbene-2,2'-disulfonic acid; 4,4'-diisothiocyanatostilbene-2,2'-disulfonic acid; 5-[dimethylamino]naphthalene-1-sulfonyl chloride (DNS, dansyl chloride); 4-(4'-dimethylaminophenylazo)benzoic acid (DABCYL); 4-dimethylaminophenylazophenyl-4'-isothiocyanate (DABITC); eosin and derivatives such as eosin and eosin isothiocyanate; erythrosin and derivatives such as erythrosin B and erythrosin isothiocyanate; ethidium; fluorescein and derivatives such as 5-carboxyfluorescein (FAM), 5-(4,6-dichlorotriazin-2-yl) aminofluorescein (DTAF), 2'7'-dimethoxy-4'5'-dichloro-6-carboxyfluorescein (JOE), fluorescein isothiocyanate (FITC), fluorescein chlorotriazinyl, naphthofluorescein, and QFITC (XRITC); fluorescamine; IR144; IR1446; Green Fluorescent Protein (GFP); Reef Coral Fluorescent Protein (RCFP); Lissamine™; Lissamine rhodamine, Lucifer yellow; Malachite Green isothiocyanate; 4-methylumbelliferone; ortho cresolphthalein; nitrotyrosine; pararosaniline; Nile Red; Oregon Green; Phenol Red; B-phycoerythrin; o-phthaldialdehyde; pyrene and derivatives such as pyrene, pyrene butyrate and succinimidyl 1-pyrene butyrate; Reactive Red 4 (Cibacron™ Brilliant Red 3B-A); rhodamine and derivatives such as 6-carboxy-X-rhodamine (ROX), 6-carboxyrhodamine (R6G), 4,7-dichlororhodamine lissamine, rhodamine B sulfonyl chloride, rhodamine (Rhod), rhodamine B, rhodamine 123, rhodamine X isothiocyanate, sulforhodamine B, sulforhodamine 101, sulfonyl chloride derivative of sulforhodamine 101 (Texas Red), N,N,N',N'-tetramethyl-6-carboxyrhodamine (TAMRA), tetramethyl rhodamine, and tetramethyl rhodamine isothiocyanate (TRITC); riboflavin; rosolic acid and terbium chelate derivatives; xanthene; dye-conjugated polymers (i.e., polymer-attached dyes) such as fluorescein isothiocyanate-dextran as well as dyes combining two or more dyes (e.g., in tandem), polymeric dyes having one or more monomeric dye units and mixtures of two or more of the aforementioned dyes or combinations thereof.

In some instances, the fluorophore (i.e., dye) is a fluorescent polymeric dye. Fluorescent polymeric dyes that find use in the subject methods and systems are varied. In some instances of the method, the polymeric dye includes a conjugated polymer. Conjugated polymers (CPs) are characterized by a delocalized electronic structure which includes a backbone of alternating unsaturated bonds (e.g., double and/or triple bonds) and saturated (e.g., single bonds) bonds, where π-electrons can move from one bond to the other. As such, the conjugated backbone may impart an extended linear structure on the polymeric dye, with limited bond angles between repeat units of the polymer. For example, proteins and nucleic acids, although also polymeric, in some cases do not form extended-rod structures but rather fold into higher-order three-dimensional shapes. In addition, CPs may form "rigid-rod" polymer backbones and experience a limited twist (e.g., torsion) angle between monomer repeat units along the polymer backbone chain. In some instances, the polymeric dye includes a CP that has a rigid rod structure. As summarized above, the structural characteristics of the polymeric dyes can have an effect on the fluorescence properties of the molecules.

Any convenient polymeric dye may be utilized. In some instances, a polymeric dye is a multichromophore that has a structure capable of harvesting light to amplify the fluorescent output of a fluorophore. In some instances, the polymeric dye is capable of harvesting light and efficiently converting it to emitted light at a longer wavelength. In some cases, the polymeric dye has a light-harvesting multichromophore system that can efficiently transfer energy to nearby luminescent species (e.g., a "signaling chromophore"). Mechanisms for energy transfer include, for example, resonant energy transfer (e.g., Forster (or fluorescence) resonance energy transfer, FRET), quantum charge exchange (Dexter energy transfer) and the like. In some instances, these energy transfer mechanisms are relatively short range; that is, close proximity of the light harvesting multichromophore system to the signaling chromophore provides for efficient energy transfer. Under conditions for efficient energy transfer, amplification of the emission from the signaling chromophore occurs when the number of individual chromophores in the light harvesting multichromophore system is large; that is, the emission from the signaling chromophore is more intense when the incident light (the "excitation light") is at a wavelength which is absorbed by the light harvesting multichromophore system than when the signaling chromophore is directly excited by the pump light.

The multichromophore may be a conjugated polymer. Conjugated polymers (CPs) are characterized by a delocalized electronic structure and can be used as highly responsive optical reporters for chemical and biological targets. Because the effective conjugation length is substantially shorter than the length of the polymer chain, the backbone contains a large number of conjugated segments in close proximity. Thus, conjugated polymers are efficient for light harvesting and enable optical amplification via energy transfer.

In some instances the polymer may be used as a direct fluorescent reporter, for example fluorescent polymers having high extinction coefficients, high brightness, etc. In some instances, the polymer may be used as a strong chromophore where the color or optical density is used as an indicator.

Polymeric dyes of interest include, but are not limited to, those dyes described by Gaylord et al. in US Publication Nos. 20040142344, 20080293164, 20080064042, 20100136702, 20110256549, 20120028828, 20120252986, 20130190193 and 20160025735 the disclosures of which are herein incorporated by reference in their entirety; and Gaylord et al., J. Am. Chem. Soc., 2001, 123 (26), pp 6417-6418; Feng et al., Chem. Soc. Rev., 2010, 39, 2411-2419; and Traina et al., J. Am. Chem. Soc., 2011, 133 (32), pp 12600-12607, the disclosures of which are herein incorporated by reference in their entirety.

In some embodiments, the porous matrix is a macroporous or microporous substrate (e.g., a frit) having an assay reagent within the pores of the matrix, such as those described in U.S. Patent Publication No. 2015/0125882, the disclosure of which is herein incorporate by reference.

In embodiments of the present disclosure, the sample cartridge includes one or more flow channels in fluid communication with the sample input. The sample may be conveyed into the flow channel by a force (e.g., centrifugal force, electrostatic force, capillary action) or may be carried by laminar flow with a sheath fluid. Sample cartridges may include 1 flow channel, 2 flow channels, 3 flow channels, 4 flow channels, 5 flow channels, 6 flow channels, 7 flow channels, 8 flow channels, 9 flow channels or 10 or more flow channels, such as 15 flow channels and including 25 or more flow channels.

In some embodiments, the flow channel is an elongated channel enclosed by one or more walls. Depending on the size of the sample, the flow channel may vary. In some embodiments, the flow channel is linear. In other embodiments, the flow channel is non-linear. For example, the flow channel may be curvilinear, circular, winding, twisted or have a helical configuration. In certain embodiments, the flow channel is branched, having two or more divergent or convergent flow paths, such as 3 or more branched flow paths, such as 4 or more branched flow paths, such as 5 or more branched flow paths, such as 6 or more branched flow paths, such as 7 or more branched flow paths, such as 8 or more branched flow paths, such as 9 or more branched flow paths and including 10 or more branched flow paths.

The length of the flow channel may vary, ranging from 10 mm to 1000 mm, such as from 15 mm to 950 mm, such as from 20 mm to 900 mm, such as from 20 mm to 850 mm, such as from 25 mm to 800 mm, such as from 30 mm to 750 mm, such as from 35 mm to 700 mm, such as from 40 mm to 650 mm, such as from 45 mm to 600 mm, such as from 50 mm to 550 mm and including from 100 mm to 500 mm. In some embodiments, the flow channel is a structure configured to receive and retain a sample having a volume ranging from 5 µL to 5000 µL, such as from 10 µL to 4000 µL, such as from 15 µL to 3000 µL, such as from 20 µL to 2000 µL, such as from 25 µL to 1000 µL, such as from 30 µL to 500 µL, such as from 40 µL to 400 µL, such as from 50 µL to 300 µL and including from 75 µL to 250 µL.

In embodiments, the cross-sectional shape of the flow channel may vary, where examples of cross-sectional shapes include, but are not limited to rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion, etc. In embodiments, the cross-sectional dimensions of the flow channel may vary, ranging from 0.01 mm to 25 mm, such as from 0.05 mm to 22.5 mm, such as from 0.1 mm to 20 mm, such as from 0.5 mm to 17.5 mm, such as from 1 mm to 15 mm, such as from 2 mm to 12.5 mm, such as from 3 mm to 10 mm and including from 5 mm to 10 mm. For example, where the flow channel is cylindrical, the diameter of the flow channel may range from 0.01 mm to 25 mm, such as from 0.05 mm to 22.5 mm, such as from 0.1 mm to 20 mm, such as from 0.5 mm to 15 mm, such as from 1 mm to 10 mm and including from 3 mm to 5 mm. The ratio of length to cross-sectional height may vary, ranging from 2 to 5000, such as from 3 to 2500, such as from 4 to 2000, such as from 5 to 1500, such as from 10 to 1000, such as from 15 to 750 and including from 25 to 500. In some instances, the ratio of length to cross-sectional height is 10. In other instances, the ratio of length to cross-sectional height is 15. In yet other instances, the ratio of length to cross-sectional height is 25.

In some embodiments, the flow channel is configured to have a cross-sectional height which is substantially equivalent to the dimensions of the target analyte. By "substantially equivalent" to the dimensions of the target analyte is meant that one or more of the height or width of the flow channel differs from the size of the target analyte by 5% or less, such as 4% or less, such as 3% or less, such as 2% or less, such as 1% or less, such as 0.5% or less, such as 0.1% or less and including 0.01% or less. In these embodiments, the cross-sectional dimensions of the flow channel are substantially the same as the size of the target analyte and the target analytes are configured to flow through the flow channel one analyte at a time. In certain instances, the target analyte are cells, such as white blood cells or red blood cells. In some embodiments, the flow channel is configured to have a cross-sectional height which substantially equivalent to the diameter of a red blood cell. In other embodiments, the flow channel is configured to have a cross-sectional height which is substantially equivalent to the diameter of a white blood cell. For example the cross-sectional height in these embodiments may be from 1 µm to 100 µm, such as from 2 µm to 90 µm, such as from 3 µm to 80 µm, such as from 4 µm to 70 µm, such as from 5 µm to 60 µm, such as from 6 µm to 60 µm and including from 5 µm to 50 µm. In certain embodiments, the cross-sectional height of the flow channel is from 15 µm to 40 µm.

In some embodiments, the flow channel is a capillary channel and is configured to move a liquid sample through the flow channel by a capillary action. The term "capillary action" is used herein in its conventional sense to refer to the movement of a liquid by intermolecular forces between the liquid (i.e., cohesion) and the surrounding walls (i.e., adhesion) of a narrow channel without the assistance of (and sometimes in opposition to) gravity. In these embodiments, the cross-sectional width of the flow channel is sufficient to provide for capillary action of the sample in the flow channel and may have a width ranging from 0.1 mm to 20 mm, such as from 0.5 mm to 15 mm, such as from 1 mm to 10 mm and including from 3 mm to 5 mm.

In some embodiments, the sample is carried through the flow channel by laminar flow with a sheath fluid. The term "sheath fluid" is used herein in its conventional sense to refer to fluid conveyed through the flow channel that is used to form an annular flow coaxial with a sample-containing fluid creating a hydrodynamically focused flow of particle-containing sample fluid in the center of the sheath fluid stream. Sheath fluids of interest may be any convenient buffered composition and may include one or more salts, including but not limited to potassium phosphate, potassium chloride, sodium phosphate, sodium chloride, preservatives as well as chelating agents, such as disodium ethylenediaminetetraacetic acid (EDTA).

The subject cartridges may be formed from any convenient material so long as the material is substantially inert and unreactive to the components flowing therethrough. In some embodiments the flow channel is formed from glass, such as a borosilicate glass. In other embodiments, the flow channel is formed from a polymeric material, including but not limited to, polycarbonates, polyvinyl chloride (PVC), polyurethanes, polyethers, polyamides, polyimides, or copolymers of these thermoplastics, such as PETG (glycol-modified polyethylene terephthalate), among other polymeric plastic materials. In certain embodiments, the housing is formed from a polyester, where polyesters of interest may include, but are not limited to, poly(alkylene terephthalates) such as poly(ethylene terephthalate) (PET), bottle-grade PET (a copolymer made based on monoethylene glycol, terephthalic acid, and other comonomers such as isophthalic acid, cyclohexene dimethanol, etc.), poly(butylene terephthalate) (PBT), and poly(hexamethylene terephthalate); poly(alkylene adipates) such as poly(ethylene adipate), poly(1,4-butylene adipate), and poly(hexamethylene adipate); poly(alkylene suberates) such as poly(ethylene suberate); poly(alkylene sebacates) such as poly(ethylene sebacate); poly(ε-caprolactone) and poly(β-propiolactone); poly(alkylene isophthalates) such as poly(ethylene isophthalate); poly(alkylene 2,6-naphthalene-dicarboxylates) such as poly(ethylene 2,6-naphthalene-dicarboxylate); poly(alkylene sulfonyl-4,4'-dibenzoates) such as poly(ethylene sulfonyl-4,4'-dibenzoate); poly(p-phenylene alkylene dicarboxylates) such as poly(p-phenylene ethylene dicarboxylates); poly(trans-1,4-cyclohexanediylalkylene dicarboxylates) such as poly(trans-1,4-cyclohexanediyl ethylene dicarboxylate); poly(1,4-cyclohexane-dimethylene alkylene dicarboxylates) such as poly(1,4-cyclohexane-dimethylene ethylene dicarboxylate); poly([2.2.2]-bicyclooctane-1,4-dimethylene alkylene dicarboxylates) such as poly([2.2.2]-bicyclooctane-1,4-dimethylene ethylene dicarboxylate); lactic acid polymers and copolymers such as (S)-polylactide, (R,S)-polylactide, poly(tetramethylglycolide), and poly(lactide-co-glycolide); and polycarbonates of bisphenol A, 3,3'-dimethylbisphenol A, 3,3',5,5'-tetrachlorobisphenol A, 3,3',5,5'-tetramethylbisphenol A; polyamides such as poly(p-phenylene terephthalamide); Mylar™, combinations thereof, and the like.

The durometer hardness of the cartridges may vary. In certain embodiments, the durometer hardness of subject cartridges ranges from 10 Shore OO to 100 Shore OO, such as 20 Shore OO to 90 Shore OO, such as 30 Shore OO to 80 Shore OO and including 40 Shore OO to 70 Shore OO. In other embodiments, the durometer hardness of subject cartridges ranges from 10 Shore A to 100 Shore A, such as 20 Shore A to 90 Shore A, such as 30 Shore A to 80 Shore A and including 40 Shore A to 70 Shore A.

In some embodiments, the flow channel includes one or more optically transmissive walls. By "optically transmissive" is meant that the walls of the flow channel permit the propagation of one or more wavelengths of light therethrough. In some embodiments, the walls of the flow channel are optically transmissive to one or more of ultraviolet light, visible light and near-infrared light. In one example, the flow channel is optically transmissive to ultraviolet light. In another example, the flow channel is optically transmissive to visible light. In yet another example, the flow channel is optically transmissive to near-infrared light. In still another example, the flow channel is transmissive to ultraviolet light and visible light. In still another example, the flow channel is transmissive to visible light and near-infrared light. In still another example, the flow channel is transmissive to ultraviolet light, visible light and near-infrared light. Depending on the desired transmissive properties of the flow channel walls, the optically transmissive wall may be any suitable material, such as quartz, glass, or polymeric, including but not limited to optically transmissive polymers such as acrylics, acrylics/styrenes, cyclo-olefin polymers, polycarbonates, polyesters and polystyrenes, among other optically transmissive polymers.

In some embodiments, the flow channel is configured to be coupled to an excitation source that applies a stimulus to the sample sufficient to generate light from the particles in the sample. In some embodiments, the excitation source is a light source configured to irradiate the sample flowing through the flow channel. In other embodiments, the excitation source is configured to apply an electrical stimulus to the flowing sample in the flow channel. In yet other embodiments, the subject cartridges are configured to be coupled to a light source and an excitation source configured to apply an electrical stimulus to the sample.

In one embodiment, the subject cartridges are configured to be coupled to a light source at one or more positions along the flow channel. In some embodiments, the cartridge is configured to be coupled to a light source at a single position along the flow channel. In other embodiments, the cartridge is configured to be coupled to a light source at 2 or more positions along the flow channel, such as at 3 or more positions, such as at 4 or more positions, such as at 5 or more positions, such as at 6 or more positions, such as at 7 or more positions, such as at 8 or more positions, such as at 9 or more positions and including at 10 or more positions along the flow channel. Where the cartridge is configured to be coupled to a light source at two or more positions along the flow channel, the light sources may be spaced apart by 1 mm or more, such as 5 mm or more, such as 10 mm or more, such as 15 mm or more, such as 25 mm or more, such as 50 mm or more and including 100 mm or more.

The light source may be any convenient irradiation protocol and may include broadband light sources (i.e., emitting light having a range of wavelengths) or a narrow band light source. In some embodiments, the light source is a non-amplified light source. For example, the light is source, in certain embodiments, is not a laser. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Any convenient broadband light source protocol may be employed, such as a halogen lamp, deuterium arc lamp, xenon arc lamp, stabilized fiber-coupled broadband light source, a broadband light emitting diode (LED) with continuous spectrum, superluminescent emitting diode, semiconductor light emitting diode, wide spectrum LED white light source, an multi-LED integrated white light source, among other broadband light sources or any combination thereof.

In other embodiments, the light source is a narrow band light source emitting a particular wavelength or a narrow range of wavelengths. In some instances, the narrow band light sources emit light having a narrow range of wavelengths, such as for example, 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Any convenient narrow band light source protocol may be employed, such as a narrow wavelength LED, laser diode or a broadband light source coupled to one or more optical bandpass filters, diffraction gratings, monochromators or any combination thereof.

Each position along the flow channel in these embodiments may include one or more light sources, as desired, such as two or more light sources, such as three or more light sources, such as four or more light sources, such as five or more light sources and including ten or more light sources. The light source may include any combination of types of light sources. In certain instances, where two lights sources are employed, a first light source may be a broadband white light source (e.g., broadband white light LED) and second light source may be a broadband near-infrared light source (e.g., broadband near-IR LED). In other instances, where two light sources are employed, a first light source may be a broadband white light source (e.g., broadband white light LED) and the second light source may be a narrow spectra light source (e.g., near-IR LED). In yet other instances, the light source is an array of two or more LEDs, such as an array of three or more LEDs, such as an array of five or more LEDs, including an array of ten or more LEDs.

In some embodiments, light sources emit light having wavelengths ranging from 200 nm to 1500 nm, such as from 250 nm to 1250 nm, such as from 300 nm to 1000 nm, such as from 350 nm to 900 nm and including from 400 nm to 800 nm. For example, the light source may include a broadband light source emitting light having wavelengths from 200 nm to 900 nm. In other instances, the light source includes a plurality of narrow band light sources emitting wavelengths ranging from 200 nm to 900 nm. For example, the light source may be plurality of narrow band LEDs (1 nm-25 nm) each independently emitting light having a range of wavelengths between 200 nm to 900 nm. In some embodiments, the narrow band light source is one or more narrow band lamps emitting light in the range of 200 nm to 900 nm, such as a narrow band cadmium lamp, cesium lamp, helium lamp, mercury lamp, mercury-cadmium lamp, potassium lamp, sodium lamp, neon lamp, zinc lamp or any combination thereof.

Depending on the sample components of interest, the subject cartridges may be configured to be coupled to a light source that irradiates in continuous or in discrete intervals. For example, in some embodiments, the light source may be configured to irradiate a sample flowing through the flow channel continuously. Where the cartridge is configured with a light source at two or more positions, the sample flowing through the flow channel may be continuously irradiated by all of the light sources simultaneously. In other instances, each light source is configured to irradiate a sample in the flow channel sequentially. In other embodiments, the light source may be configured to irradiated in regular intervals, such as every 0.001 microseconds, every 0.01 microseconds, every 0.1 microseconds, every 1 microsecond, every 10 microseconds, every 100 microseconds and including every 1000 microseconds. The light source may be configured to irradiate one or more times at any given measurement period, such as 2 or more times, such as 3 or more times, including 5 or more times at each measurement period.

Where one or more of the positions along the flow channel include more than one light source, each of the light sources may be configured to irradiate the sample simultaneously or sequentially, or a combination thereof. In some embodiments, the light sources at each position are configured to irradiate the sample simultaneously. In other embodiments, the light sources are configured to irradiate the sample sequentially. In the embodiments, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. The duration of irradiation by each light source may be the same or different.

The time period between irradiation by each light source may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. The delay between irradiation by each light source may be the same or different.

The light source may be configured to be positioned at a distance from the flow channel which varies depending on the type of light source and characteristics of the flow channel. For example, the light source may be positioned 0.01 mm or more from the flow stream, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more from the flow channel. The light source may also be positioned at an angle with respect to the flow channel. For example, the light source may be positioned at an angle with respect to the longitudinal axis of the flow channel which ranges from 10° to 90°, such as from 15° to 85°, such as from 20° to 80°, such as from 25° to 75° and including from 30° to 60°. In certain embodiments, the light source is positioned at a 90° angle with respect to the longitudinal axis of the flow channel.

In some embodiments, the cartridge is configured such that the light source is positioned in direct contact with the flow channel. In other embodiments, the cartridge is configured such that the light source is in direct contact with the sample flowing through the flow channel. In these embodiments, the light source may form a part of the flow channel.

In some embodiments, the position along the flow channel configured to be coupled to a light source may include one or more optical adjustment components. By "optical adjustment" is meant that light from the light source is changed as desired. In some embodiments, one or more of the positions along the flow channel configured to be coupled to a light source includes an optical adjustment component for adjusting the dimensions of the light from the light source, the wavelengths of the light, the focus of the light or to collimate the light. In some instances, optical adjustment is a magnification protocol so as to increase the dimensions of the light, such as increasing the dimensions by 5% or more, such as by 10% or more, such as by 25% or more, such as by 50% or more and including increasing the dimensions by 75% or more. In other embodiments, optical adjustment includes focusing the light so as to reduce the light dimensions, such as by 5% or greater, such as by 10% or greater, such as by 25% or greater, such as by 50% or greater and including reducing the dimensions by 75% or greater. In certain embodiments, optical adjustment includes collimating the light. The term "collimate" is used in its conventional sense to refer to the optically adjusting the collinearity of light propagation or reducing divergence by the light of from a common axis of propagation. In some instances, collimating includes narrowing the spatial cross section of a light beam. In certain embodiments, the optical adjustment component is a wavelength separator. The term "wavelength separator" is used herein in its conventional sense to refer to an optical protocol for separating polychromatic light into its component wavelengths. Wavelength separation, according to certain embodiments, may include selectively passing or blocking specific wavelengths or wavelength ranges of the polychromatic light. Wavelength separation protocols of interest which may be a part of or combined with the subject flow cell nozzles, include but are not limited to, colored glass, bandpass filters, interference filters, dichroic mirrors, diffraction gratings, monochromators and combinations thereof, among other wavelength separating protocols. In some embodiments, the wavelength separator is an optical filter. For example, the optical filter may be a bandpass filter having minimum bandwidths ranging from 2 nm to 100 nm, such as from 3 nm to 95 nm, such as from 5 nm to 95 nm, such as from 10 nm to 90 nm, such as from 12 nm to 85 nm, such as from 15 nm to 80 nm and including bandpass filters having minimum bandwidths ranging from 20 nm to 50 nm.

In embodiments, the cartridge may be configured such that the optical adjustment component is positioned in direct contact with the flow channel. In other embodiments, the cartridge is configured such that the optical adjustment component is in direct contact with the sample flowing through the flow channel. In these embodiments, the optical adjustment component may form a part of the flow channel or the flow channel may include an optical adjustment component (e.g., lens, collimator, wavelength filter) integrated directly into the flow channel.

FIG. 1 depicts a top view of a cartridge according to certain embodiments. Cartridge 100 includes a sample input 101 that is in fluid communication with flow channel 102. A stimulus is applied to the sample in flow channel 102 resulting in fluorescence by particles in the sample. Cartridge 100 may be configured to be coupled to a light source to apply a light stimulus or configured to be coupled to an excitation source that applies an electrical stimulus. Light from the sample at detection region 104 is propagated through light channel 103 to detector 105. Components of the sample may also be conveyed to waste collection zone 106 and recollected or discarded.

Figure 2:
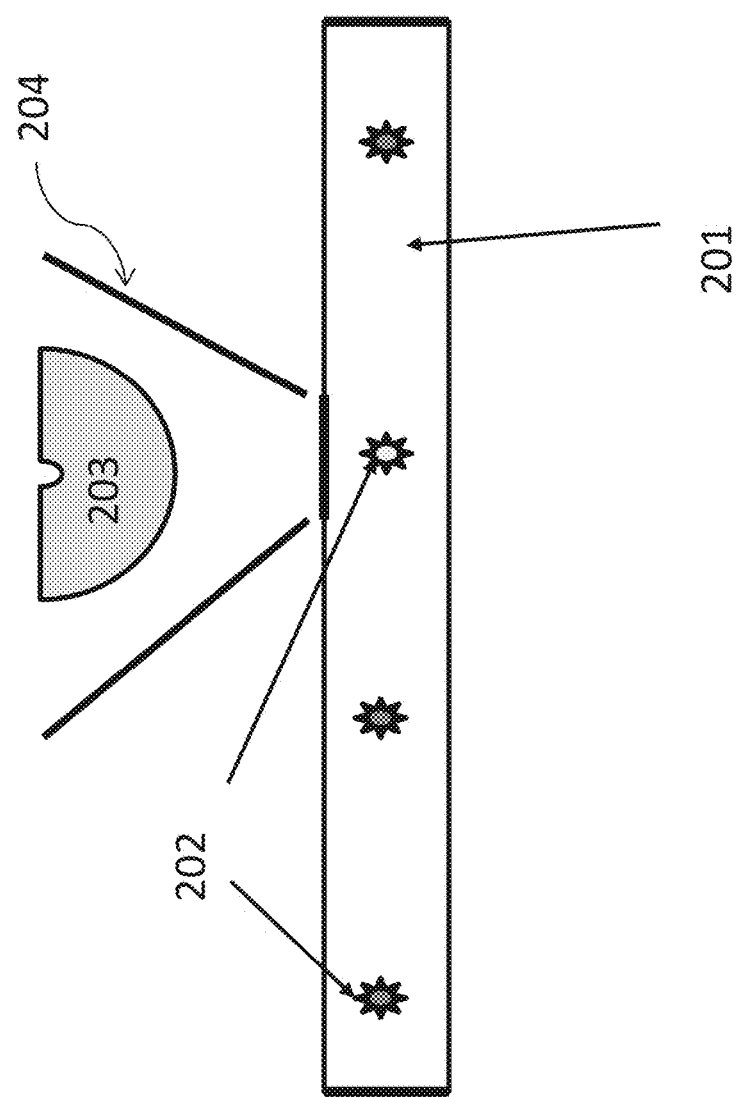
FIG. 2 depicts a side view of a cartridge according to certain embodiments.

FIG. 2 depicts a side view of a cartridge according to certain embodiments. Cartridge 200 provides a sample to flow channel 201 from a sample input (not shown). Particles in the sample 202 are irradiated by light source 203 which is focused onto the flowing sample by focusing component 204. Particles of interest emit fluorescence and light is detected at a detection region through a light channel.

In other embodiments, the subject cartridges are configured to be coupled to an excitation source that applies an electrical stimulus to a sample in the flow channel. In embodiments, the electrical stimulus is sufficient to stimulate fluorescence by particles in the sample. The cartridge may be configured with one or more electrodes for applying the electrical stimulus to the sample in the flow channel, such as 2 or more electrodes, such as 3 or more electrodes, such as 4 or more electrodes, such as 5 or more electrodes, such as 6 or more electrodes, such as 7 or more electrodes, such as 8 or more electrodes, such as 9 or more electrodes and including 10 or more electrodes.

The electrodes may further include electrical connections for electrically coupling electrodes to external circuitry. The electrodes may also include electrical connections for electrically coupling certain electrodes together. In one example, the cartridge includes two or more electrodes associated with the flow channel, and includes a source of electricity for activating and deactivating each electrode. For instance, each electrode may be electronically coupled to and controlled by a set of manual switches or a computer-controlled processor coupled to electronic circuitry for activating and deactivating each electrode.

In embodiments, a voltage is applied to the electrodes to apply the electrical stimulus to the sample in the flow channel. Depending on the thickness and dielectric constant of the flow channel, a voltage applied to the electrodes may range from 0.001 mV to 1000 mV, such as from 0.005 mV to 750 mV, such as from 0.01 mV to 500 mV, such as from 0.05 mV to 250 mV, such as from 0.1 mV to 200 mV and including from 1 mV to 100 mV.

The electrodes may be formed from any suitable metal capable of applying an electrical stimulus and may include but is not limited to aluminum, brass, chromium, cobalt, copper, gold, indium, iron, lead, nickel, platinum, palladium, tin, steel (e.g., stainless steel), silver, zinc and combinations and alloys thereof, such as for example an aluminum alloy, aluminum-lithium alloy, an aluminum-nickel-copper alloy, an aluminum-copper alloy, an aluminum-magnesium alloy, an aluminum-magnesium oxide alloy, an aluminum-silicon alloy, an aluminum-magnesium-manganese-platinum alloy, a cobalt alloy, a cobalt-chromium alloy, a cobalt-tungsten alloy, a cobalt-molybdenum-carbon alloy, a cobalt-chromium-nickel-molybdenum-iron-tungsten alloy, a copper alloy, a copper-arsenic alloy, a copper-berrylium alloy, a copper-silver alloy, a copper-zinc alloy (e.g., brass), a copper-tin alloy (e.g., bronze), a copper-nickel alloy, a copper-tungsten alloy, a copper-gold-silver alloy, a copper-nickel-iron alloy, a copper-manganese-tin alloy, a copper-aluminum-zinc-tin alloy, a copper-gold alloy, a gold alloy, a gold-silver alloy, an indium alloy, an indium-tin alloy, an indium-tin oxide alloy, an iron alloy, an iron-chromium alloy (e.g., steel), an iron-chromium-nickel alloy (e.g., stainless steel), an iron-silicon alloy, an iron-chromium-molybdenum alloy, an iron-carbon alloy, an iron-boron alloy, an iron-magnesium alloy, an iron-manganese alloy, an iron molybdenum alloy, an iron-nickel alloy, an iron-phosphorus alloy, an iron-titanium alloy, an iron-vanadium alloy, a lead alloy, a lead-antimony alloy, a lead-copper alloy, a lead-tin alloy, a lead-tin-antimony alloy, a nickel alloy, a nickel-manganese-aluminum-silicon alloy, a nickel-chromium alloy, a nickel-copper alloy, a nickel, molybdenum-chromium-tungsten alloy, a nickel-copper-iron-manganese alloy, a nickel-carbon alloy, a nickel-chromium-iron alloy, a nickel-silicon alloy, a nickel-titanium alloy, a silver alloy, a silver-copper alloy (e.g., sterling silver) a silver-coper-germanium alloy (e.g., Argentium sterling silver), a silver-gold alloy, a silver-copper-gold alloy, a silver-platinum alloy, a tin alloy, a tin-copper-antimony alloy, a tin-lead-copper alloy, a tin-lead-antimony alloy, a titanium alloy, a titanium-vanadium-chromium alloy, a titanium-aluminum alloy, a titanium-aluminum-vanadium alloy, a zinc alloy, a zinc-copper alloy, a zinc-aluminum-magnesium-copper alloy, a zirconium alloy, a zirconium-tin alloy or a combination thereof.

In certain embodiments, the electrodes are configured along the flow channel as discrete electrodes. In other embodiments, the electrodes are positioned linearly along the flow channel. In yet other embodiments, the electrodes are arranged as an array of discrete regions. The discrete regions may have a random or non-random pattern, including patterns of specific shapes (circle, square, triangle or other polygon) or other pattern. In certain instances, the electrodes are arranged in a grid pattern.

Each electrode may be the same or different size, as desired and may range from 0.01 to 5 cm$^2$, such as 0.05 to 5 cm$^2$, such as 0.1 to 4.5 cm$^2$, such as 0.25 to 4.5 cm$^2$, such as 0.5 to 4 cm$^2$ and including 1 to 4 cm$^2$. Each electrode may also have the same or different physical properties from each other, such as material make-up, electrical conductivity, surface wettability, etc. Where the subject cartridge includes an array or network of electrodes, the array may include one or more electrodes, such as two or more electrodes and including three or more electrodes.

In embodiments, the cartridge may be configured such that the electrodes are positioned in direct contact with the flow channel (e.g., affixed to the inner wall of the flow channel). In other embodiments, the cartridge is configured such that the electrodes are in direct contact with the sample flowing through the flow channel. In these embodiments, the electrodes may form a part of the flow channel or the flow channel may include an electrode integrated directly into the flow channel.

Figure 3:
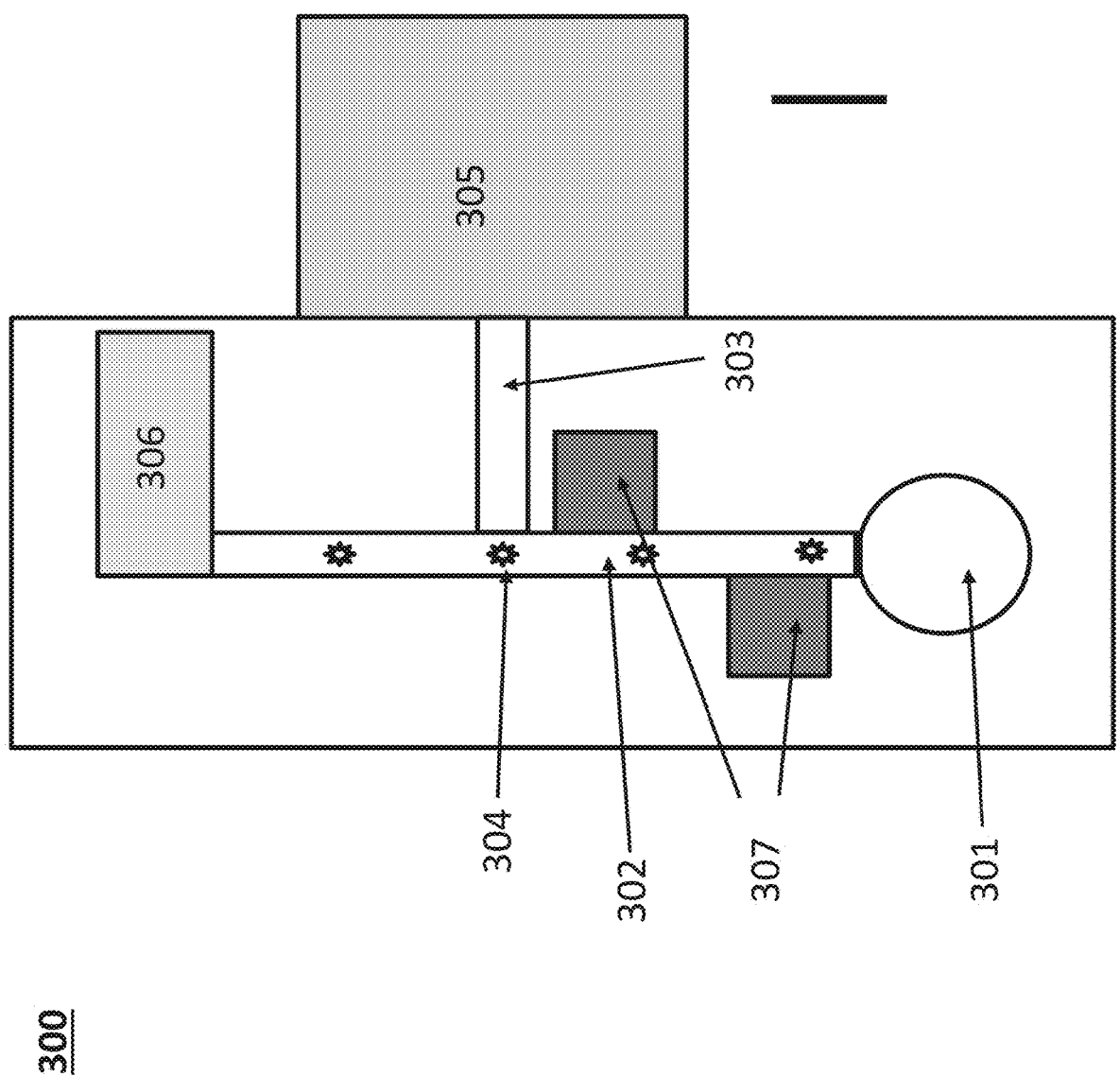
FIG. 3 depicts a top view of a cartridge having an excitation source configured to apply an electrical stimulus according to certain embodiments.

FIG. 3 depicts a top view of a cartridge having an excitation source configured to apply an electrical stimulus according to certain embodiments. Cartridge 300 includes a sample input 301 that is in fluid communication with flow channel 302. An electrical stimulus is applied through electrodes 307 to the sample in flow channel 302 resulting in fluorescence by particles in the sample. Light from the sample at detection region 304 is propagated through light channel 303 to detector 305. Components of the sample may also be conveyed to waste collection zone 306 and recollected or discarded.

As summarized above, the subject cartridges include a light channel coupled to the flow channel at a detection region. In embodiments, a stimulus is applied to the sample by an excitation source (e.g., light source or electrical stimuli source) sufficient to stimulate emission of light, and light from the components in the sample is collected and measured by a detector. The light from the sample is propagated from the detection region through the light channel directly to the detector. By "directly to the detector" is meant that the detected light from the sample at the detection region is not transmitted through or reflected by the walls of the light channel to the detector. In certain embodiments, light detected directly from the sample is light that propagates from the detection region through the free space of the light channel to the detector. In other embodiments, light detected directly from the sample is light that propagates through the sample fluid to the detector. As described in greater detail below, the internal walls of the light channel may include a non-reflective region (e.g., have an anti-reflective coating) where light does not reflect off of the walls of the light channel.

The light channel is coupled to the flow channel at the detection region. The light channel may be coupled to the flow channel at an angle, such as at an angle with respect to the longitudinal axis of the flow channel which ranges from 10° to 90°, such as from 15° to 85°, such as from 20° to 80°, such as from 25° to 75° and including from 30° to 60°. In certain embodiments, the light channel is coupled to the flow channel at a 90° angle with respect to the longitudinal axis of the flow channel.

In embodiments, the flow channel and the light channel are in optical communication at the detection region. In some embodiments, the flow channel and light channel are also in fluid communication at the detection region, where sample flowing through the flow channel may flow into the light channel, such as into 10% or more of the light channel, such as into 25% or more of the light channel, such as into 50% or more of the light channel, such as into 75% or more of the light channel, such as into 90% or more of the light channel, such as into 95% or more of the light channel and including into the entire (i.e., 100%) light channel.

The subject cartridge may include one or more light channels in optical communication with the flow channel, such as 2 light channels, 3 light channels, 4 light channels, 5 light channels, 6 light channels, 7 light channels, 8 light channels, 9 light channels or 10 or more light channels, such as 15 light channels and including 25 or more light channels. Each light channel is coupled to the flow channel at a detection region. The length of each light channel may independently vary, ranging from 10 mm to 1000 mm, such as from 15 mm to 950 mm, such as from 20 mm to 900 mm, such as from 20 mm to 850 mm, such as from 25 mm to 800 mm, such as from 30 mm to 750 mm, such as from 35 mm to 700 mm, such as from 40 mm to 650 mm, such as from 45 mm to 600 mm, such as from 50 mm to 550 mm and including from 100 mm to 500 mm.

In embodiments, the cross-sectional shape of the light channel may vary, where examples of cross-sectional shapes include, but are not limited to rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion, etc. In embodiments, the cross-sectional dimensions of the light channel may vary, ranging from 0.01 mm to 25 mm, such as from 0.05 mm to 22.5 mm, such as from 0.1 mm to 20 mm, such as from 0.5 mm to 17.5 mm, such as from 1 mm to 15 mm, such as from 2 mm to 12.5 mm, such as from 3 mm to 10 mm and including from 5 mm to 10 mm. For example, where the light channel is cylindrical, the diameter of the light channel may range from 0.01 mm to 25 mm, such as from 0.05 mm to 22.5 mm, such as from 0.1 mm to 20 mm, such as from 0.5 mm to 15 mm, such as from 1 mm to 10 mm and including from 3 mm to 5 mm. The ratio of length to cross-sectional height may vary, ranging from 2 to 5000, such as from 3 to 2500, such as from 4 to 2000, such as from 5 to 1500, such as from 10 to 1000, such as from 15 to 750 and including from 25 to 500. In some instances, the ratio of length to cross-sectional height is 10. In other instances, the ratio of length to cross-sectional height is 15. In yet other instances, the ratio of length to cross-sectional height is 25.

In some embodiments, the light channel includes one or more optically opaque regions. By "optically opaque" is meant that opaque region of the light channel wall restrict the propagation of one or more wavelengths of light therethrough. In some embodiments, the walls of the light channel are optically opaque to one or more of ultraviolet light, visible light and near-infrared light. In one example, the light channel is optically opaque to ultraviolet light. In another example, the light channel is optically opaque to visible light. In yet another example, the light channel is optically opaque to near-infrared light. In still another example, the light channel is opaque to ultraviolet light and visible light. In still another example, the light channel is opaque to visible light and near-infrared light. In still another example, the light channel is opaque to ultraviolet light, visible light and near-infrared light. Depending on the desired opaque properties of the light channel walls, the optically opaque wall may be any suitable material, such as quartz, glass, silica, titanium dioxide, zinc oxide, silicon nitride, carbon black, aluminum oxide or polymeric, including but not limited to optically opaque polymers such as acrylics, acrylics/styrenes, cyclo-olefin polymers, polycarbonates, polyesters and polystyrenes, among other optically opaque polymers. The optically opaque region may extend across 5% or more of the light channel wall, such as across 10% or more, such as across 25% or more, such as across 50% or more, such as across 75% or more, such as across 90% or more, such as across 95% or more and including across 99% or more of the light channel wall. In certain embodiments, the entire light channel (i.e., 100%) is optically opaque. For example, the optically opaque region may extend across from 5% to 100% of the light channel, such as from 10% to 90%, such as from 20% to 80%, such as from 30% to 70% and including from 40% to 60%.

In some embodiments, the light channel includes one or more optically reflective regions. By "optically reflective" is meant that refleive region of the light channel wall are capable of changing the direction of light propagation (e.g., by specular reflectance) of one or more wavelengths of light in the light channel. In some embodiments, the walls of the light channel are optically reflective to one or more of ultraviolet light, visible light and near-infrared light. In one example, the light channel is optically reflective to ultraviolet light. In another example, the light channel is optically reflective to visible light. In yet another example, the light channel is optically reflective to near-infrared light. In still another example, the light channel is reflective to ultraviolet light and visible light. In still another example, the light channel is reflective to visible light and near-infrared light. In still another example, the light channel is reflective to ultraviolet light, visible light and near-infrared light. Depending on the desired reflective properties of the light channel walls, the optically reflective wall may be any suitable material, such as gold, silver, aluminum, chromium, nickel, platinum, Inconel and any combinations thereof. The optically reflective region may extend across 5% or more of the light channel wall, such as across 10% or more, such as across 25% or more, such as across 50% or more, such as across 75% or more, such as across 90% or more, such as across 95% or more and including across 99% or more of the light channel wall. In certain embodiments, the entire light channel (i.e., 100%) is optically reflective. For example, the optically reflective region may extend across from 5% to 100% of the light channel, such as from 10% to 90%, such as from 20% to 80%, such as from 30% to 70% and including from 40% to 60%.

In some embodiments, the light channel includes one or more anti-reflective regions. By "anti-reflective" is meant that internal walls of the light channel exhibit little to no specular reflection of light propagating through the light channel (i.e., light from the detection region to the detector) that impinges onto the light channel walls. In embodiments, 5% or less of the light that impinges the internal walls of the light channel at the anti-reflective regions is reflected, such as 4% or less, such as 3% or less, such as 2% or less, such as 1% or less, such as 0.5% or less, such as 0.1% or less, such as 0.05% or less, such as 0.01% or less, such as 0.001% or less and including 0.0001% or less. In certain embodiments, no light is reflected from the surface of the light channel walls. As such, the amount of light reflected by the internal walls of the light channel that reaches and impinges onto the detector surface is 5% or less, such as 4% or less, such as 3% or less, such as 2% or less, such as 1% or less, such as 0.5% or less, such as 0.1% or less, such as 0.05% or less, such as 0.01% or less, such as 0.001% or less and including 0.0001% or less. In other words, the subject cartridges are configured to propagate substantially only direct light from the detection region to the detector, where little-to-none of the light that impinges onto the detector surface from the detection region is light propagated by internal reflection by the walls of the light channel.

Each light channel of the subject cartridges may have one or more anti-reflective regions, such as 2 or more anti-reflective regions, such as 3 or more anti-reflective regions, such as 4 or more anti-reflective regions, such as 5 or more anti-reflective regions, such as 6 or more anti-reflective regions, such as 7 or more anti-reflective regions, such as 8 or more anti-reflective regions, such as 9 or more anti-reflective regions and including 10 or more anti-reflective regions. Each anti-reflective region may be any desired shape or pattern, such as circle, square, triangle or other polygon pattern. Each anti-reflective region may be the same or different size, for example, where each anti-reflective region is 1 $cm^2$ or greater, such as 1.5 $cm^2$ or greater, such as 2 $cm^2$ or greater, such as 3 $cm^2$ or greater, such as 5 $cm^2$ or greater, such as 10 $cm^2$ or greater, such as 15 $cm^2$ or greater and including 25 $cm^2$ or greater.

The one or more anti-reflective regions may together extend across 5% or more of the light channel wall, such as across 10% or more, such as across 25% or more, such as across 50% or more, such as across 75% or more, such as across 90% or more, such as across 95% or more and including across 99% or more of the light channel wall. In certain embodiments, the anti-reflective region extends across the entire light channel (i.e., 100%). For example, the anti-reflective region may extend across from 5% to 100% of the light channel, such as from 10% to 90%, such as from 20% to 80%, such as from 30% to 70% and including from 40% to 60%.

In some embodiments, the walls of the light channel in the anti-reflective region may be formed from an anti-reflective material, such as anti-reflective polymer or a material that contains an incorporated anti-reflective compound (e.g., a light absorbing compound such as carbon black). In other embodiments, the walls of the light channel may have an anti-reflective coating. Any convenient anti-reflective coating may be employed, such as where the anti-reflective coating may be a single-layer interference anti-reflective coating, a multi-layer interference anti-reflective coating, an absorbing anti-reflective coating, among other types of anti-reflective coatings. In some embodiments, the anti-reflective coating includes one or more of silica, titanium dioxide, zinc oxide, silicon nitride, carbon black, aluminum oxide or a combination thereof. In other embodiments, the anti-reflective coating is a polymeric anti-reflective coating, such as a polymer composition containing nanoparticles.

The anti-reflective coating may be one or more layers, such as 2 or more layers, such as 3 or more layers, such as 4 or more layers and including 5 or more layers. The thickness of each layer may vary, such as a thickness of 50 nm or more, such as 100 nm or more, such as 150 nm or more, such as 250 nm or more, such as 300 nm or more, such as 500 nm or more, such as 600 nm or more and including a thickness of 750 nm or more. The anti-reflective coating may have a total thickness which varies, depending on the extent that reflectivity of the light channel walls is restricted and may be 0.0001 mm or greater, such as 0.0005 mm or greater, such as 0.001 mm or greater, such as 0.005 mm or greater, such as 0.01 mm or greater, such as 0.05 mm or greater, such as 0.1 mm or greater, such as 0.5 mm or greater, such as 1 mm or greater, such as 5 mm or greater and including an anti-reflective coating having a thickness that is 10 mm or greater.

As summarized above, the flow channel and the light channel are coupled together at a detection region. In embodiments, light from components of the sample is propagated from the detection region through the light channel to the detector. The detection region may be any size and shaped junction between the flow channel and light channel. In some embodiments, the detection region is has a square shape, rectangle shape, trapezoidal shape, triangular shape, or other polygonal shape. In other embodiments, the detection region has a curvilinear shapes, e.g., circles, ovals, as well as irregular shapes, e.g., a parabolic bottom portion coupled to a planar top portion. The size of the detection region may vary, ranging from 0.1 to 10 $mm^3$, such as 0.5 to 9 $mm^3$, such as 1.0 to 8 $mm^3$, such as 1.5 to 7 $mm^3$, such as 2.0 to 6 $mm^3$, such as 2.5 to 5 $mm^3$, and including 2 to 4 $mm^3$.

Where more than one light channel is present, the subject cartridges include more than one detection region, such as 2 or more detection regions, such as 3 or more, such as 4 or more, such as 5 or more, such as 6 or more, such as 7 or more, such as 8 or more, such as 9 or more and including 10 or more detection regions.

In certain embodiments, the walls of the flow channel at the detection region are reflective. The term "reflective" is used herein in its conventional sense to refer to the capability of the detection region walls to change the direction of an electromagnetic wave (e.g., by specular reflectance). All or part of the walls may be reflective. For example, 10% or more of the detection region walls may be reflective, such as 25% or more, such as 50% or more, such as 75% or more, such as 90% or more and including 95% or more of the walls of the detection region may be reflective. In certain embodiments, the walls of the detection region are reflective to a range of wavelengths, such as from 200 nm to 1500 nm, such as from 250 nm to 1250 nm, such as from 300 nm to 1000 nm, such as from 350 nm to 900 nm and including from 400 nm to 800 nm. In one example, the walls of the detection region are reflective to ultraviolet, visible light and near-infrared light. In another example, the walls of the detection region are reflective to ultraviolet and visible light. In yet another example, the walls of the detection region are reflective to visible light. In yet another example, the walls of the detection region are reflective to ultraviolet light. In still another example, the walls of the detection region are reflective to infrared light.

Where the walls of the detection region are reflective, the walls may include one or more layers of a high reflector coating, such as two or more layers, such as three or more layers, such as four or more layers and including five or more layers of the high-reflector coating. The high reflector coating may be thin layer metallic coating, such as but not limited to: gold, silver, aluminum, chromium, nickel, platinum, Inconel and any combinations thereof. Depending on the reflectivity spectrum desired, the thickness of the high-reflector coating may range from 100 nm to 900 nm, such as from 150 nm to 850 nm, such as from 200 nm to 800 nm, such as from 250 nm to 750 nm, such as from 300 nm to 700 nm and including a thickness ranging from 350 nm to 650 nm. Where the detection region walls include more than one layer of high reflector coating, the thickness of each layer may vary, such as a thickness of 50 nm or more, such as 100 nm or more, such as 150 nm or more, such as 250 nm or more, such as 300 nm or more, such as 500 nm or more, such as 600 nm or more and including a thickness of 750 nm or more.

In certain embodiments, the subject cartridges further include one or more waste collection zones. In some instances, the waste collection zone is positioned downstream from the detection region and sample flowing through the flow channel may be directed to waste collection zone after detection of at the detection region. In other instances, the waste collection zone is positioned downstream from the detection region and a portion of the sample flowing through the flow channel is diverted to the waste collection zone, such as through an auxiliary flow channel that branches off downstream from the detection region.

The waste collection zone may be any size and shape depending on the size of the sample fluid flowing through the sample cartridge. In some embodiments, the waste collection zone is has a square shape, rectangle shape, trapezoidal shape, triangular shape, or other polygonal shape. In other embodiments, the waste collection zone has a curvilinear shapes, e.g., circles, ovals, as well as irregular shapes, e.g., a parabolic bottom portion coupled to a planar top portion. The size of the waste collection zone may vary, ranging from 0.1 to 10 $mm^3$, such as 0.5 to 9 $mm^3$, such as 1.0 to 8 $mm^3$, such as 1.5 to 7 $mm^3$, such as 2.0 to 6 $mm^3$, such as 2.5 to 5 $mm^3$, and including 2 to 4 $mm^3$.

In some instances, the waste collection zone includes an opening configured for removing the waste composition from the waste collection zone. In some instances, the opening to the waste collection zone is coupled to a conduit that directs the collected waste composition to a container. The waste composition may be discarded or may be purified as desired.

Embodiments of interest also include a cartridge as describe above with a sample pre-loaded into the sample input. In some embodiments, the sample is a biological sample. The term "biological sample" is used in its conventional sense to include a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may include any type of organismic material, including both healthy and diseased components (e.g., cancerous, malignant, necrotic, etc.). In certain embodiments, the biological sample is a liquid sample, such as whole blood or derivative thereof, plasma, tears, sweat, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. Biological samples of interest may be obtained from human subjects of both genders and at any stage of development (i.e., neonates, infant, juvenile, adolescent, adult), where in certain embodiments the human subject is a juvenile, adolescent or adult. While the present disclosure may be applied to samples from a human subject, it is to be understood that microfluidic devices may also be employed with samples from other non-human animal subjects such as, but not limited to, birds, mice, rats, dogs, cats, livestock and horses.

The amount of sample pre-loaded into the cartridge may vary, ranging in certain embodiments from 5 µL to 1000 µL, such as from 10 µL to 900 µL, such as from 15 µL to 800 µL, such as from 20 µL to 700 µL, such as from 25 µL to 600 µL, such as from 30 µL to 500 µL, such as from 40 µL to 400 µL, such as from 50 µL to 300 µL and including from 75 µL to 250 µL.

Systems for Detecting Components of a Sample

Aspects of the present disclosure also include systems for detecting particle components of a sample, such as cells in a biological sample. Systems according to certain embodiments include a power source operably coupled to an excitation source (e.g., light source, source that applies an electrical stimulus), a photodetector and one or more of the sample cartridges described above. As described above, in embodiments a stimulus is applied to the sample by the excitation source sufficient to stimulate emission of light. The light from the sample is propagated from the detection region through the light channel directly to the detector.

In embodiments, systems include a power source configured to be operably coupled to an excitation source. The power source may be any convenient power source, including both alternating current (AC) or direct current (DC) power sources. In some embodiments, the power source is a battery coupled to the excitation source. In other embodiments, the excitation source is configured to be coupled to a particle sorting system and the excitation source receives power from the particle sorting system.

As described above, the excitation source is configured to apply a stimulus to the sample sufficient to generate light (e.g., scattered light or luminescence such as fluorescence or phosphorescence) from the particles in the sample. In some embodiments, the excitation source is a light source configured to irradiate the sample flowing through the flow channel. In other embodiments, the excitation source is configured to apply an electrical stimulus to the flowing sample in the flow channel. In yet other embodiments, the subject cartridges are configured to be coupled to a light source and an excitation source configured to apply an electrical stimulus to the sample.

In some embodiments, systems of interest include a light source configured to irradiate the sample in the flow channel of the cartridge. The light source may be any convenient irradiation protocol and may include broadband light sources (i.e., emitting light having a range of wavelengths) or a narrow band light source. In some embodiments, the light source is a non-amplified light source. For example, the light is source, in certain embodiments, is not a laser. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Any convenient broadband light source protocol may be employed, such as a halogen lamp, deuterium arc lamp, xenon arc lamp, stabilized fiber-coupled broadband light source, a broadband light emitting diode (LED) with continuous spectrum, superluminescent emitting diode, semiconductor light emitting diode, wide spectrum LED white light source, an multi-LED integrated white light source, among other broadband light sources or any combination thereof.

In other embodiments, the light source is a narrow band light source emitting a particular wavelength or a narrow range of wavelengths. In some instances, the narrow band light sources emit light having a narrow range of wavelengths, such as for example, 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Any convenient narrow band light source protocol may be employed, such as a narrow wavelength LED, laser diode or a broadband light source coupled to one or more optical bandpass filters, diffraction gratings, monochromators or any combination thereof.

The light source may be configured to irradiate the sample in the flow channel in continuous or in discrete intervals. For example, in some embodiments, the light source may be configured to irradiate a sample flowing through the flow channel continuously. In other instances, each light source is configured to irradiate a sample in the flow channel sequentially. In other embodiments, the light source may be configured to irradiate the flow channel in regular intervals, such as every 0.001 microseconds, every 0.01 microseconds, every 0.1 microseconds, every 1 microsecond, every 10 microseconds, every 100 microseconds and including every 1000 microseconds. The light source may be configured to irradiate one or more times at any given measurement period, such as 2 or more times, such as 3 or more times, including 5 or more times at each measurement period.

Where systems include more than one light source, each of the light sources may be configured to irradiate the sample in the flow channel simultaneously or sequentially, or a combination thereof. In some embodiments, the light sources are configured to irradiate the sample simultaneously. In other embodiments, the light sources are configured to irradiate the sample sequentially. In these embodiments, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. The duration of irradiation by each light source may be the same or different.

The time period between irradiation by each light source may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. The delay between irradiation by each light source may be the same or different.

The light source may be positioned at a distance from the flow channel which varies depending on the type of light source and characteristics of the flow channel. For example, the light source may be positioned 0.01 mm or more from the flow stream, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more from the flow channel. The light source may also be positioned at an angle with respect to the flow channel. For example, the light source may be positioned at an angle with respect to the longitudinal axis of the flow channel which ranges from 10° to 90°, such as from 15° to 85°, such as from 20° to 80°, such as from 25° to 75° and including from 30° to 60°. In certain embodiments, the light source is positioned at a 90° angle with respect to the longitudinal axis of the flow channel.

In certain embodiments, the power source is operably coupled to an excitation source configured to apply an electrical stimulus. The excitation source may be configured with one or more electrodes for applying the electrical stimulus to the sample in the flow channel, such as 2 or more electrodes, such as 3 or more electrodes, such as 4 or more electrodes, such as 5 or more electrodes, such as 6 or more electrodes, such as 7 or more electrodes, such as 8 or more electrodes, such as 9 or more electrodes and including 10 or more electrodes.

Systems, in these embodiments, may also include external circuitry for electrically coupling electrodes together and for coupling the electrodes to manual switches or a computer controlled processor for activating and deactivating each electrode. The power source coupled to the electrode may apply an electrical stimulus that ranges from 0.001 mV to 1000 mV, such as from 0.005 mV to 750 mV, such as from 0.01 mV to 500 mV, such as from 0.05 mV to 250 mV, such as from 0.1 mV to 200 mV and including from 1 mV to 100 mV.

Electrodes for applying the electrical stimulus in the subject systems may be formed from a metal, such as electrodes formed from aluminum, brass, chromium, cobalt, copper, gold, indium, iron, lead, nickel, platinum, palladium, tin, steel (e.g., stainless steel), silver, zinc and combinations and alloys thereof, such as for example an aluminum alloy, aluminum-lithium alloy, an aluminum-nickel-copper alloy, an aluminum-copper alloy, an aluminum-magnesium alloy, an aluminum-magnesium oxide alloy, an aluminum-silicon alloy, an aluminum-magnesium-manganese-platinum alloy, a cobalt alloy, a cobalt-chromium alloy, a cobalt-tungsten alloy, a cobalt-molybdenum-carbon alloy, a cobalt-chromium-nickel-molybdenum-iron-tungsten alloy, a copper alloy, a copper-arsenic alloy, a copper-beryllium alloy, a copper-silver alloy, a copper-zinc alloy (e.g., brass), a copper-tin alloy (e.g., bronze), a copper-nickel alloy, a copper-tungsten alloy, a copper-gold-silver alloy, a copper-nickel-iron alloy, a copper-manganese-tin alloy, a copper-aluminum-zinc-tin alloy, a copper-gold alloy, a gold alloy, a gold-silver alloy, an indium alloy, an indium-tin alloy, an indium-tin oxide alloy, an iron alloy, an iron-chromium alloy (e.g., steel), an iron-chromium-nickel alloy (e.g., stainless steel), an iron-silicon alloy, an iron-chromium-molybdenum alloy, an iron-carbon alloy, an iron-boron alloy, an iron-magnesium alloy, an iron-manganese alloy, an iron molybdenum alloy, an iron-nickel alloy, an iron-phosphorus alloy, an iron-titanium alloy, an iron-vanadium alloy, a lead alloy, a lead-antimony alloy, a lead-copper alloy, a lead-tin alloy, a lead-tin-antimony alloy, a nickel alloy, a nickel-manganese-aluminum-silicon alloy, a nickel-chromium alloy, a nickel-copper alloy, a nickel, molybdenum-chromium-tungsten alloy, a nickel-copper-iron-manganese alloy, a nickel-carbon alloy, a nickel-chromium-iron alloy, a nickel-silicon alloy, a nickel-titanium alloy, a silver alloy, a silver-copper alloy (e.g., sterling silver) a silver-coper-germanium alloy (e.g., Argentium sterling silver), a silver-gold alloy, a silver-copper-gold alloy, a silver-platinum alloy, a tin alloy, a tin-copper-antimony alloy, a tin-lead-copper alloy, a tin-lead-antimony alloy, a titanium alloy, a titanium-vanadium-chromium alloy, a titanium-aluminum alloy, a titanium-aluminum-vanadium alloy, a zinc alloy, a zinc-copper alloy, a zinc-aluminum-magnesium-copper alloy, a zirconium alloy, a zirconium-tin alloy or a combination thereof.

Systems of the present disclosure also include one or more detectors. Detectors of interest may include, but are not limited to optical sensors or photodetectors, such as active-pixel sensors (APSs), avalanche photodiode, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, the transmitted light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In some embodiments, the imaging sensor is a CCD camera. For example, the camera may be an electron multiplying CCD (EMCCD) camera or an intensified CCD (ICCD) camera. In other embodiments, the imaging sensor is a CMOS-type camera. Where the transmitted light is measured with a CCD, the active detecting surface area of the CCD may vary, such as from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

The number of photodetectors in the subject systems may vary, as desired. For example, the subject systems may include one photodetector or more, such as two photodetectors or more, such as three photodetectors or more, such as four photodetectors or more, such as five photodetectors or more and including ten photodetectors or more. In certain embodiments, systems include one photodetector. In other embodiments, systems include two photodetectors. Each photodetector may be oriented with respect to distal end of the light channel (as referenced in an X-Y plane) at an angle which varies, such as at an angle of 60° or less, such as 55° or less, such as 50° or less, such as 45° or less, such as 30° or less, such as 15° or less, such as 10° or less and including orienting the photodetector such that the active detection surface faces the distal end of the light channel.

Where the subject systems include more than one photodetector, each photodetector may be the same, or the collection of two or more photodetectors may be a combination of different photodetectors. For example, where the subject systems include two photodetectors, in some embodiments the first photodetector is a CCD-type device and the second photodetector (or imaging sensor) is a CMOS-type device. In other embodiments, both the first and second photodetectors are CCD-type devices. In yet other embodiments, both the first and second photodetectors are CMOS-type devices. In still other embodiments, the first photodetector is a CCD-type device and the second photodetector is a photomultiplier tube. In still other embodiments, the first photodetector is a CMOS-type device and the second photodetector is a photomultiplier tube. In yet other embodiments, both the first and second photodetectors are photomultiplier tubes.

In embodiments of the present disclosure, detectors of interest are configured to measure light only from the detection region directly through the light channel at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light only from the detection region directly through the light channel at 400 or more different wavelengths.

In some embodiments, detectors of interest are configured to measure light only from the detection region directly through the light channel over a range of wavelengths (e.g., 200 nm-1000 nm). In certain embodiments, detectors of interest are configured to collect spectra of light over a range of wavelengths. For example, systems may include one or more detectors configured to collect spectra of light over one or more of the wavelength ranges of 200 nm-1000 nm. In yet other embodiments, detectors of interest are configured to measure light only from the detection region directly through the light channel at one or more specific wavelengths. For example, systems may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, one or more detectors may be configured to be paired with specific fluorophores, such as those used with the sample in a fluorescence assay.

In embodiments, the detector is configured to measure light continuously or in discrete intervals. In some instances, detectors of interest are configured to take measurements of the light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In some instances, the photodetector also includes an optical adjustment component. In some instances, optical adjustment is a magnification protocol configured to increase the size of the field of light captured by the detector, such as by 5% or greater, such as by 10% or greater, such as by 25% or greater, such as by 50% or greater and including increasing the field of light captured by the detector by 75% or greater. In other instances, optical adjustment is a de-magnification protocol configured to decrease the field of light captured by the detector, such as by 5% or greater, such as by 10% or greater, such as by 25% or greater, such as by 50% or greater and including decreasing the field of light captured by the detector by 75% or greater. In certain embodiments, optical adjustment is a focusing protocol configured to focus the light collected by the detector, such as by focusing the beam of collected light by 5% or greater, such as by 10% or greater, such as by 25% or greater, such as by 50% or greater and including focusing the beam of collected light by 75% or greater.

Optical adjustment components may be any convenient device or structure which provides the desired change in the collected light beam and may include but is not limited to lenses, mirrors, pinholes, slits, gratings, light refractors, and any combinations thereof. The detector may include one or more optical adjustment components as needed, such as two or more, such as three or more, such as four or more and including five or more optical adjustment components. In certain embodiments, the detector includes a focusing lens. The focusing lens, for example may be a de-magnifying lens. In other instances, the focusing lens is a magnifying lens. In other embodiments, the detector includes a collimator.

In certain embodiments, systems include a combination of different optical adjustment components, such as a combination of pinholes, lenses, mirrors, slits, etc. For example, in some embodiments, systems include a focusing lens and a collimating lens. In other embodiments, systems include a collimating mirror and a focusing lens. In yet other embodiments, systems include a focusing lens and a pinhole structure. In still other embodiments, systems include a collimating lens and a pinhole structure. In still other embodiments, systems include a collimating lens and a slit structure.

In some embodiments, the detector and the optical adjustment component are in optical communication, but are not physically in contact. Depending on the size of the detector, the optical adjustment component may be positioned 0.05 mm or more from the detector, 0.1 mm or more, such as 0.5 mm or more, such as 1 mm or more, such as 10 mm or more, such as 25 mm or more, such as 50 mm or more, such as 100 mm or more, such as 250 mm or more, including 500 mm or more. In other embodiments, the optical adjustment component is physically coupled to the detector, such as with an adhesive, co-molded together or integrated together in a housing having the optical adjustment component positioned adjacent to the detector. As such, the optical adjustment component and detector may be integrated into a single unit.

In some instances, optical adjustment components include one or more fiber optics which are configured to relay light from the distal end of the light channel to the detector. Suitable fiber optics for propagating light from the light channel to the active surface of the detector include, but is not limited to, fiber optics systems such as those described in U.S. Pat. No. 6,809,804, the disclosure of which is herein incorporated by reference.

In certain embodiments, the optical adjustment component is a wavelength separator. As discussed above, wavelength separators of interest refer to an optical protocol for separating polychromatic light into its component wavelengths for detection. Wavelength separation, according to certain embodiments, may include selectively passing or blocking specific wavelengths or wavelength ranges of the polychromatic light. To separate wavelengths of light, the light collected from the light channel may be passed through any convenient wavelength separating protocol, including but not limited to colored glass, bandpass filters, interference filters, dichroic mirrors, diffraction gratings, monochromators and combinations thereof, among other wavelength separating protocols. Systems may include one or more wavelength separators, such as two or more, such as three or more, such as four or more, such as five or more and including 10 or more wavelength separators. In one example, detectors include one bandpass filter. In another example, detectors include two or more bandpass filters. In another example, detectors include two or more bandpass filters and a diffraction grating. In yet another example, detectors include a monochromator. In certain embodiments, detectors include a plurality of bandpass filters and diffraction gratings configured into a filter wheel setup. Where detectors include two or more wavelength separators, the wavelength separators may be utilized individually or in series to separate polychromatic light into component wavelengths. In some embodiments, wavelength separators are arranged in series. In other embodiments, wavelength separators are arranged individually such that one or more measurements are conducted using each of the wavelength separators.

In some embodiments, detectors include one or more optical filters, such as one or more bandpass filters. For example, optical filters of interest may include bandpass filters having minimum bandwidths ranging from 2 nm to 100 nm, such as from 3 nm to 95 nm, such as from 5 nm to 95 nm, such as from 10 nm to 90 nm, such as from 12 nm to 85 nm, such as from 15 nm to 80 nm and including bandpass filters having minimum bandwidths ranging from 20 nm to 50 nm. In other embodiments, the wavelength separator is a diffraction grating. Diffraction gratings may include, but are not limited to transmission, dispersive or reflective diffraction gratings. Suitable spacings of the diffraction grating may vary depending on the configuration of the light channel, detector and other optical adjust protocols present (e.g., focusing lens), ranging from 0.01 µm to 10 µm, such as from 0.025 µm to 7.5 µm, such as from 0.5 µm to 5 µm, such as from 0.75 µm to 4 µm, such as from 1 µm to 3.5 µm and including from 1.5 µm to 3.5 µm.

In some embodiments, systems include a sample injection port coupled to the sample input to provide sample to the cartridge. In embodiments, the sample injection system is configured to provide suitable amount of sample to the sample input. The rate of sample conveyed to the cartridge by the sample injection port may be 1 µL/sec or more, such as 2 µL/sec or more, such as 3 µL/sec or more, such as 5 µL/sec or more, such as 10 µL/sec or more, such as 15 µL/sec or more, such as 25 µL/sec or more, such as 50 µL/sec or more and including 100 µL/sec or more.

The sample injection port may be an orifice positioned in a wall of the sample input or may be a conduit positioned at the proximal end of the sample input. The sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the sample input. For example, the sample injection port may be a conduit positioned to have the orifice of the sample injection port in line with the sample input. Where the sample injection port is a conduit positioned in line with the sample input, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.5 mm to 2.5 mm, such as from 0.75 mm to 2.25 mm, such as from 1 mm to 2 mm and including from 1.25 mm to 1.75 mm, for example 1.5 mm.

Where the sample is carried through the flow channel by laminar flow with a sheath fluid, systems of interest may also include a sheath fluid injection port configured to provide a sheath fluid to the sample input. In these embodiments, the sheath fluid injection system is configured to provide a flow of sheath fluid to the sample input, for example in conjunction with the sample to produce a laminated stream of sheath fluid surrounding the sample in the flow channel. The rate of sheath fluid conveyed to the flow cell nozzle chamber by the may be 25 µL/sec or more, such as 50 µL/sec or more, such as 75 µL/sec or more, such as 100 µL/sec or more, such as 250 µL/sec or more, such as 500 µL/sec or more, such as 750 µL/sec or more, such as 1000 µL/sec or more and including 2500 µL/sec or more.

The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sheath fluid injection port orifice may vary depending on shape, in certain instances, having an opening ranging from 0.5 mm to 2.5 mm, such as from 0.75 mm to 2.25 mm, such as from 1 mm to 2 mm and including from 1.25 mm to 1.75 mm, for example 1.5 mm.

Methods for Detecting Components of a Sample

Aspects of the disclosure also include methods for detecting particle components of a sample, such as cells in a biological sample. Methods according to certain embodiments include irradiating a sample containing particles in a flow channel, detecting light (e.g., fluorescent light) at one or more wavelengths from the sample at a detection region through a light channel. In certain embodiments, the sample is a biological sample and methods include detecting the presence of two or more different types of cells.

In some embodiments, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

In practicing the subject methods, a fluidic sample is first introduced into the sample input of a sample cartridge (as described above). In some embodiments, methods may include obtaining the sample from a subject. In some instances, the methods may include preparing an obtained sample in some manner, e.g., combining a sample with one or more assay reagents, e.g., described above.

Sample components flow through the flow channel where a stimulus (e.g., light or an electrical stimulus) is applied to the sample and measurements of light emission from the sample (e.g., fluorescence, phosphorescence) as desired are separately recorded for each particle. Depending on the properties of the sample being interrogated, the stimulus may be applied to sample at 0.001 mm or more of the flow channel, such as 0.005 mm or more, such as 0.01 mm or more, such as 0.05 mm or more, such as 0.1 mm or more, such as 0.5 mm or more and including 1 mm or more of the flow channel.

Light from the detection region is propagated through the light channel and detected by one or more photodetectors. As described above, suitable light detecting protocols, include but are not limited to optical sensors or photodetectors, such as active-pixel sensors (APSs), avalanche photodiode, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, light from the detection region is measured through the light channel with a charge-coupled device (CCD), semiconductor charge-coupled devices (CCD), active pixel sensors (APS), complementary metal-oxide semiconductor (CMOS) image sensors, N-type metal-oxide semiconductor (NMOS) image sensors, a photodiode or a photomultiplier tube. In certain embodiments, light is measured with a charge-coupled device (CCD). Where the light from the sample at the detection region is measured with a CCD, the active detecting surface area of the CCD may vary, such as from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

The data recorded is analyzed in real time or stored in a data storage and analysis means, such as a computer, as desired. In embodiments of the present disclosure according to certain embodiments, particles in the sample are detected and may be uniquely identified based on the measured fluorescence of each particle in one or more detection channels, as desired. Fluorescence emitted in detection channels used to identify the particles and binding complexes associated therewith may be measured following excitation (e.g., with a light source or electrical stimulus source), or may be measured separately following excitation with distinct excitation sources. If separate excitation sources are used to excite the particle labels, the labels may be selected such that all the labels are excitable by each of the excitation sources used.

Methods in certain embodiment also include data acquisition, analysis and recording, such as with a computer, where multiple data channels record fluorescence data from each particle as it passes through the detection region of the subject cartridges. In these embodiments, analysis includes classifying and counting particles such that each particle is present as a set of digitized parameter values. The subject systems may be set to trigger on a selected parameter in order to distinguish the particles of interest from background and noise. "Trigger" refers to a preset threshold for detection of a parameter and may be used as a means for detecting passage of a particle through the detection region. Detection of an event that exceeds the threshold for the selected parameter triggers acquisition of fluorescence data for the particle. Data is not acquired for particles or other components in the medium being assayed which cause a response below the threshold.

Computer-Controlled Systems

Aspects of the present disclosure further include computer controlled systems for practicing the subject methods, where the systems further include one or more computers for complete automation or partial automation of a system for practicing methods described herein. In some embodiments, systems include a computer having a computer readable storage medium with a computer program stored thereon, where the computer program when loaded on the computer includes instructions for applying a stimulus from an excitation source to a sample having particles in a flow path of a cartridge as described above and algorithm for detecting one or more wavelengths of light directly from the sample at the detection region from light propagating through the light channel to the detector.

In embodiments, the system includes an input module, a processing module and an output module. In some embodiments, the subject systems may include an input module such that parameters or information about each fluidic sample, intensity and wavelengths (discrete or ranges) of the applied light source, voltages of an applied electrical stimulus, properties of the cartridge including sample input orifice size, flow channel diameter, number of light channels, number of detection regions, duration of applied stimulus by excitation source (e.g., duration of irradiation by the light source, duration of applied voltage), number of different excitation sources (e.g., number of electrodes), distance from light source to the flow channel, focal length of any optical adjustment components, refractive index of flow channel medium (e.g., sheath fluid), presence of any wavelength separators, properties of wavelength separators including bandpass width, opacity, grating spacing as well as properties and sensitivity of photodetectors.

The processing module includes memory having a plurality of instructions for performing the steps of the subject methods, such as applying a stimulus (e.g., light or electrical stimulus) to a sample in a flow channel; and detecting one or more wavelengths of light directly from the sample at the detection region from light propagating through the light channel.

After the processing module has performed one or more of the steps of the subject methods, an output module communicates the results to the user, such as by displaying on a monitor or by printing a report.

The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods, such as applying a stimulus (e.g., light or electrical stimulus) to a sample in a flow channel; and detecting one or more wavelengths of light directly from the sample at the detection region from light propagating through the light channel.

The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid state storage devices (including magnetic or optical disks or tape or RAM, or any other suitable device, either fixed or portable). The processor may include a general purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction therewith, in managing the treatment of a health condition, such as HIV, AIDS or anemia.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various computer operating systems may be employed on any of the computer platforms, possibly depending on the type and/or make of computer platform chosen. Appropriate operating systems include Windows NT®, Windows XP, Windows 7, Windows 8, iOS, Sun Solaris, Linux, OS/400, Compaq Tru64 Unix, SGI IRIX, Siemens Reliant Unix, and others.

Kits

Aspects of the invention further include kits, where kits include one or more of the cartridges as described herein. In some embodiments, kits include the one or more sets of the cartridges, optical adjustment components (e.g., focusing lens, cutoff filters) and excitation sources, such as LEDs or an excitation source configured to apply an electrical stimulus. In certain instances, kits can include one or more assay components (e.g., labeled reagents, buffers, etc., such as described above). In some instances, the kits may further include a sample collection device, e.g., a lance or needle configured to prick skin to obtain a whole blood sample, a pipette, etc., as desired. The subject kits may also include a waste collection container.

In some embodiments, kits include a fluidic composition, such as a digestive enzyme composition or buffer solution. Example buffers may include but are not limited to PBS (phosphate) buffer, acetate buffer, N,N-bis(2-hydroxyethyl) glycine (Bicine) buffer, 3-{[tris(hydroxymethyl)methyl]amino}propanesulfonic acid (TAPS) buffer, 2-(N-morpholino)ethanesulfonic acid (MES) buffer, citrate buffer, tris(hydroxymethyl)methylamine (Tris) buffer, N-tris(hydroxymethyl)methylglycine (Tricine) buffer, 3-[N-Tris(hydroxymethyl)methylamino]-2-hydroxypropanesulfonic Acid (TAPSO) buffer, 4-2-hydroxyethyl-1-piperazineethanesulfonic acid (HEPES) buffer, 2-{[tris(hydroxymethyl)methyl]amino}ethanesulfonic acid (TES) buffer, piperazine-N,N'-bis(2-ethanesulfonic acid) (PIPES) buffer, dimethylarsinic acid (Cacodylate) buffer, saline sodium citrate (SSC) buffer, 2(R)-2-(methylamino)succinic acid (succinic acid) buffer, potassium phosphate buffer, N-Cyclohexyl-2-aminoethanesulfonic acid (CHES) buffer, among other types of buffered solutions. In certain instances, the fluidic composition is a cytometer-grade solution.

In still other embodiments, kits include a labelling reagent composition. For example, the labelling reagent composition may be a fluorophore, chromophore, enzyme, redox label, radiolabels, acoustic label, Raman (SERS) tag, mass tag, isotope tag, magnetic particle, microparticle or nanoparticle or a combination thereof. In some cases, the labelling reagent includes a labelled biomolecule, such as a polypeptide, a nucleic acid and a polysaccharide that is labelled with a fluorophore, chromophore, enzyme, redox label, radiolabels, acoustic label, Raman (SERS) tag, mass tag, isotope tag, magnetic particle, microparticle or nanoparticle or a combination thereof.

The various assay components of the kits may be present in separate containers, or some or all of them may be pre-combined. For example, in some instances, one or more components of the kit, e.g., each cartridge is present in a sealed pouch, e.g., a sterile foil pouch or envelope.

In addition to the above components, the subject kits may further include (in certain embodiments) instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject cartridges, particle detection systems, methods and computer systems find use in a variety of applications where it is desirable to analyze and sort particle components in a sample in a fluid medium, such as a biological sample. Embodiments of the invention find use where it is desirable to provide a improved cell sorting accuracy and enhanced particle detection.

Embodiments of the invention also find use in applications where cells prepared from a biological sample may be desired for research, laboratory testing or for use in therapy. In some embodiments, the subject methods and devices may facilitate obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems may facilitate obtaining cells from fluidic or tissue samples to be used in therapy. Methods and devices of the present disclosure allow for detecting and collecting cells from a biological sample (e.g., organ, tissue, tissue fragment, fluid) with enhanced efficiency and low cost as compared to traditional flow cytometry systems.

Although the foregoing invention has been described in some detail by way of illustration and example for purposes of clarity of understanding, it is readily apparent to those of ordinary skill in the art in light of the teachings of this disclosure that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A cartridge comprising:
a sample input;
a waste collection zone;
a linear flow channel connecting the sample input to the waste collection zone;
a light channel that is distinct from the flow channel and comprises a lumen; and
a detection region, wherein the flow channel and the light channel are coupled at the detection region such that only light from the detection region can propagate directly through the lumen of the light channel to a photodetector.

2. The cartridge according to claim 1, wherein the light channel comprises an anti-reflective region.

3. The cartridge according to claim 2, wherein the anti-reflective region extends across from 10% to 100% of the light channel.

4. The cartridge according to claim 1, wherein the light channel comprises a reflective region.

5. The cartridge according to claim 4, wherein the reflective region extends across from 10% to 100% of the light channel.

6. The cartridge according to claim 1, wherein the light channel comprises an opaque region.

7. The cartridge according to claim 6, wherein the opaque region extends across from 10% to 100% of the light channel.

8. The cartridge according to claim 6, wherein the entire light channel is opaque.

9. The cartridge according to claim 1, wherein the light channel is positioned at an angle with respect to the flow channel.

10. The cartridge according to claim 9, wherein the light channel is orthogonal to the flow channel.

11. The cartridge according to claim 1, wherein the cartridge is configured to be coupled to an excitation source.

12. The cartridge according to claim 11, wherein the excitation source is a light source.

13. The system according to claim 12, wherein the light source is a non-amplified light source.

14. The system according to claim 13, wherein the light source is a light emitting diode.

15. The cartridge according to claim 11, wherein the excitation source is configured to apply an electrical stimulus.

16. The cartridge according to claim 15, wherein the excitation source comprises an electrode.

17. The cartridge according to claim 16, wherein the electrode is configured to apply an electrical stimulus to a particle in a sample sufficient to produce fluorescence from the particle.

18. A system comprising;
a power source configured to be operably coupled to an excitation source;
a cartridge comprising:
a sample input;
a waste collection zone;
a linear flow channel connecting the sample input to the waste collection zone,
a light channel that is distinct from the flow channel and comprises a lumen, and a detection region, wherein the flow channel and the light channel are coupled at the detection region such that only light from the detection region can propagate directly through the lumen of the light channel to a photodetector; and
the photodetector configured to measure one or more wavelengths of light propagating directly from the light channel.

19. A method comprising:
applying a stimulus from an excitation source to a sample comprising particles in a flow path of a cartridge, the cartridge comprising:

a sample input;

a waste collection zone a linear flow channel connecting the sample input to the waste collection zone; and a light channel that is distinct from the flow channel and comprises a lumen, and a detection region, wherein the flow channel and the light channel are coupled at the detection region such that only light from the detection region can propagate directly through the lumen of the light channel to a photodetector;

the excitation source coupled to the detection region; and detecting one or more wavelengths of light directly from the sample at the detection region from light propagating through the light channel to the photodetector.

* * * * *